(12) United States Patent
Thompson

(10) Patent No.: US 11,080,734 B2
(45) Date of Patent: Aug. 3, 2021

(54) PRICING SYSTEM FOR IDENTIFYING PRICES FOR VEHICLES OFFERED BY VEHICLE DEALERSHIPS AND OTHER ENTITIES

(71) Applicant: REDBUMPER, LLC, Plano, TX (US)

(72) Inventor: Bruce T. Thompson, Fairview, TX (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 444 days.

(21) Appl. No.: 14/208,042

(22) Filed: Mar. 13, 2014

(65) Prior Publication Data

US 2014/0278805 A1 Sep. 18, 2014

Related U.S. Application Data

(60) Provisional application No. 61/798,025, filed on Mar. 15, 2013.

(51) Int. Cl.
*G06Q 30/02* (2012.01)
*G06Q 30/06* (2012.01)

(52) U.S. Cl.
CPC ......... *G06Q 30/0206* (2013.01); *G06Q 30/02* (2013.01); *G06Q 30/0278* (2013.01);
(Continued)

(58) Field of Classification Search
CPC ................................................ G06Q 30/0206
See application file for complete search history.

(56) References Cited

U.S. PATENT DOCUMENTS 3,792,445 A  2/1974  Bucks et al.
4,258,421 A  3/1981  Juhasz et al.
(Continued)

FOREIGN PATENT DOCUMENTS

CA  2494350  5/2004
EP  0461888  3/1995

OTHER PUBLICATIONS

Johns et al., Competitive Intelligence in Service Marketing, Aug. 3. 2010, Emerald Group Publishing Limited, vol. 28, p. 551-570 (Year: 2010).*

(Continued)

*Primary Examiner* — Crystol Stewart
(74) *Attorney, Agent, or Firm* — Stoel Rives LLP

(57) ABSTRACT

A method includes identifying, for a specified vehicle, a competitive set of other vehicles based on input from a user. The method also includes receiving from the user one or more parameters to be used in pricing the specified vehicle. The method further includes identifying a recommended price for the specified vehicle using the competitive set and the one or more parameters. The one or more parameters could include a selection or definition of multiple pricing formulas to be used to identify the recommended price. Different pricing formulas can be associated with different lengths of time that the specified vehicle is available. A first of the pricing formulas can be used to identify a first recommended price for the specified vehicle and, after a specified amount of time has elapsed, a second of the pricing formulas can be used to identify a lower second recommended price for the specified vehicle.

15 Claims, 8 Drawing Sheets

(52) U.S. Cl.
CPC ..... *G06Q 30/0283* (2013.01); *G06Q 30/0629* (2013.01); *G06Q 30/0601* (2013.01)

(56) References Cited

U.S. PATENT DOCUMENTS

| | | | |
|---|---|---|---|
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |
| 5,694,595 A | 12/1997 | Jacobs et al. |
| 5,729,452 A | 3/1998 | Smith et al. |
| 5,787,177 A | 7/1998 | Leppek |
| 5,790,785 A | 8/1998 | Klug et al. |
| 5,835,712 A | 11/1998 | DuFresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | LeMole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Swartz et al. |
| 6,240,365 B1 | 5/2001 | Bunn |
| 6,263,268 B1 | 7/2001 | Nathanson |
| 6,285,932 B1 | 9/2001 | De Belledeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,643,663 B1 | 11/2003 | Dabney et al. |
| 6,654,726 B1 | 11/2003 | Hanzek |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 * | 11/2005 | Boyd ................. G06Q 30/0283 |
| | | 705/1.1 |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 * | 10/2006 | Huyler ................ G06Q 30/02 |
| | | 705/400 |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 * | 10/2007 | Boyd ................. G06Q 30/0206 |
| | | 705/14.43 |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |

(56) References Cited

U.S. PATENT DOCUMENTS

| | | | |
|---|---|---|---|
| 7,613,627 B2 | 11/2009 | Doyle et al. | |
| 7,620,484 B1 | 11/2009 | Chen | |
| 7,624,342 B2 | 11/2009 | Matveyenko et al. | |
| 7,657,594 B2 | 2/2010 | Banga et al. | |
| 7,664,667 B1 | 2/2010 | Ruppelt et al. | |
| 7,739,007 B2 | 6/2010 | Logsdon | |
| 7,747,680 B2 | 6/2010 | Ravikumar et al. | |
| 7,778,841 B1 | 8/2010 | Bayer et al. | |
| 7,801,945 B1 | 9/2010 | Geddes et al. | |
| 7,818,380 B2 | 10/2010 | Tamura et al. | |
| 7,861,309 B2 | 12/2010 | Spearman et al. | |
| 7,865,409 B1 | 1/2011 | Monaghan | |
| 7,870,253 B2 | 1/2011 | Muilenburg et al. | |
| 7,899,701 B1* | 3/2011 | Odom | G06Q 30/0206 705/7.35 |
| 7,908,051 B2 | 3/2011 | Oesterling | |
| 7,979,506 B2 | 7/2011 | Cole | |
| 8,010,423 B2 | 8/2011 | Bodin et al. | |
| 8,019,501 B2 | 9/2011 | Breed | |
| 8,036,788 B2 | 10/2011 | Breed | |
| 8,051,159 B2 | 11/2011 | Muilenburg et al. | |
| 8,055,544 B2 | 11/2011 | Ullman et al. | |
| 8,060,274 B2 | 11/2011 | Boss et al. | |
| 8,095,403 B2 | 1/2012 | Price | |
| 8,099,308 B2 | 1/2012 | Uyeki | |
| 8,135,804 B2 | 3/2012 | Uyeki | |
| 8,145,379 B2 | 3/2012 | Schwinke | |
| 8,190,322 B2 | 5/2012 | Lin et al. | |
| 8,209,259 B2 | 6/2012 | Graham, Jr. et al. | |
| 8,212,667 B2 | 7/2012 | Petite et al. | |
| 8,271,473 B2 | 9/2012 | Berg | |
| 8,271,547 B2 | 9/2012 | Taylor et al. | |
| 8,275,717 B2 | 9/2012 | Ullman et al. | |
| 8,285,439 B2 | 10/2012 | Hodges | |
| 8,296,007 B2 | 10/2012 | Swaminathan et al. | |
| 8,311,905 B1 | 11/2012 | Campbell et al. | |
| 8,355,950 B2* | 1/2013 | Colson | G06Q 30/02 705/14.46 |
| 8,407,664 B2 | 3/2013 | Moosmann et al. | |
| 8,428,815 B2 | 4/2013 | Van Engelshoven et al. | |
| 8,438,310 B2 | 5/2013 | Muilenburg et al. | |
| 8,521,654 B2 | 8/2013 | Ford et al. | |
| 8,538,894 B2 | 9/2013 | Ullman et al. | |
| 8,645,193 B2* | 2/2014 | Swinson | G06Q 10/06 705/26.1 |
| 8,676,638 B1 | 3/2014 | Blair et al. | |
| 8,725,341 B2 | 5/2014 | Ogasawara | |
| 8,745,641 B1 | 6/2014 | Coker | |
| 8,849,689 B1 | 9/2014 | Jagannathan et al. | |
| 8,886,389 B2 | 11/2014 | Edwards et al. | |
| 8,924,071 B2 | 12/2014 | Stanek et al. | |
| 8,954,222 B2 | 2/2015 | Costantino | |
| 8,996,230 B2 | 3/2015 | Lorenz et al. | |
| 8,996,235 B2 | 3/2015 | Singh et al. | |
| 9,014,908 B2 | 4/2015 | Chen et al. | |
| 9,015,059 B2 | 4/2015 | Sims et al. | |
| 9,026,304 B2 | 5/2015 | Olsen, III et al. | |
| 9,047,722 B2 | 6/2015 | Kurnik et al. | |
| 9,165,413 B2 | 10/2015 | Jones et al. | |
| 9,183,681 B2 | 11/2015 | Fish | |
| 9,325,650 B2 | 4/2016 | Yalavarty et al. | |
| 9,349,223 B1 | 5/2016 | Palmer | |
| 9,384,597 B2 | 7/2016 | Koch et al. | |
| 9,577,866 B2 | 2/2017 | Rogers et al. | |
| 9,596,287 B2 | 3/2017 | Rybak et al. | |
| 9,619,945 B2 | 4/2017 | Adderly et al. | |
| 9,659,495 B2 | 5/2017 | Modica et al. | |
| 9,706,008 B2 | 7/2017 | Rajan et al. | |
| 9,715,665 B2 | 7/2017 | Schondorf et al. | |
| 9,754,304 B2* | 9/2017 | Taira | G06Q 30/0621 |
| 9,778,045 B2 | 10/2017 | Bang | |
| 9,836,714 B2 | 12/2017 | Lander et al. | |
| 10,032,139 B2 | 7/2018 | Adderly et al. | |
| 10,083,411 B2 | 9/2018 | Kinsey et al. | |
| 10,229,394 B1 | 3/2019 | Davis et al. | |
| 10,475,256 B2 | 11/2019 | Chowdhury et al. | |
| 2001/0005831 A1 | 6/2001 | Lewin et al. | |
| 2001/0014868 A1 | 8/2001 | Herz et al. | |
| 2001/0037332 A1 | 11/2001 | Miller et al. | |
| 2001/0039594 A1 | 11/2001 | Park et al. | |
| 2001/0054049 A1 | 12/2001 | Maeda et al. | |
| 2002/0023111 A1 | 2/2002 | Arora et al. | |
| 2002/0024537 A1 | 2/2002 | Jones et al. | |
| 2002/0026359 A1 | 2/2002 | Long et al. | |
| 2002/0032626 A1 | 3/2002 | DeWolf et al. | |
| 2002/0032701 A1 | 3/2002 | Gao et al. | |
| 2002/0042738 A1 | 4/2002 | Srinivasan et al. | |
| 2002/0046245 A1 | 4/2002 | Hillar et al. | |
| 2002/0049831 A1 | 4/2002 | Platner et al. | |
| 2002/0052778 A1 | 5/2002 | Murphy et al. | |
| 2002/0059260 A1 | 5/2002 | Jas | |
| 2002/0065698 A1 | 5/2002 | Schick et al. | |
| 2002/0065739 A1 | 5/2002 | Florance et al. | |
| 2002/0069110 A1 | 6/2002 | Sonnenberg | |
| 2002/0073080 A1 | 6/2002 | Lipkin | |
| 2002/0082978 A1 | 6/2002 | Ghouri et al. | |
| 2002/0091755 A1 | 7/2002 | Narin | |
| 2002/0107739 A1 | 8/2002 | Schlee | |
| 2002/0111727 A1 | 8/2002 | Vanstory et al. | |
| 2002/0111844 A1 | 8/2002 | Vanstory et al. | |
| 2002/0116418 A1 | 8/2002 | Lachhwani et al. | |
| 2002/0123359 A1 | 9/2002 | Wei et al. | |
| 2002/0124053 A1 | 9/2002 | Adams et al. | |
| 2002/0128728 A1 | 9/2002 | Murakami et al. | |
| 2002/0129054 A1 | 9/2002 | Ferguson et al. | |
| 2002/0133273 A1 | 9/2002 | Lowrey et al. | |
| 2002/0138331 A1 | 9/2002 | Hosea et al. | |
| 2002/0143646 A1 | 10/2002 | Boyden et al. | |
| 2002/0154146 A1 | 10/2002 | Rodriquez et al. | |
| 2002/0169851 A1 | 11/2002 | Weathersby et al. | |
| 2002/0173885 A1 | 11/2002 | Lowrey et al. | |
| 2002/0196273 A1 | 12/2002 | Krause | |
| 2002/0198761 A1 | 12/2002 | Ryan et al. | |
| 2002/0198878 A1 | 12/2002 | Baxter et al. | |
| 2003/0014443 A1 | 1/2003 | Bernstein et al. | |
| 2003/0023632 A1 | 1/2003 | Ries et al. | |
| 2003/0033378 A1 | 2/2003 | Needham et al. | |
| 2003/0036832 A1 | 2/2003 | Kokes et al. | |
| 2003/0036964 A1 | 2/2003 | Boyden et al. | |
| 2003/0037263 A1 | 2/2003 | Kamat et al. | |
| 2003/0046179 A1 | 3/2003 | Anabtawi et al. | |
| 2003/0051022 A1 | 3/2003 | Sogabe et al. | |
| 2003/0055666 A1 | 3/2003 | Roddy et al. | |
| 2003/0061263 A1 | 3/2003 | Riddle | |
| 2003/0065532 A1* | 4/2003 | Takaoka | G06Q 30/06 705/80 |
| 2003/0065583 A1 | 4/2003 | Takaoka | |
| 2003/0069785 A1 | 4/2003 | Lohse | |
| 2003/0069790 A1 | 4/2003 | Kane | |
| 2003/0074392 A1 | 4/2003 | Campbell et al. | |
| 2003/0095038 A1 | 5/2003 | Dix | |
| 2003/0101262 A1 | 5/2003 | Godwin | |
| 2003/0115292 A1 | 6/2003 | Griffin et al. | |
| 2003/0120502 A1 | 6/2003 | Robb et al. | |
| 2003/0145310 A1 | 7/2003 | Thames et al. | |
| 2003/0177050 A1 | 9/2003 | Crampton et al. | |
| 2003/0177175 A1 | 9/2003 | Worley et al. | |
| 2003/0225853 A1 | 12/2003 | Wang et al. | |
| 2003/0229623 A1 | 12/2003 | Chang et al. | |
| 2003/0233246 A1 | 12/2003 | Snapp et al. | |
| 2004/0012631 A1 | 1/2004 | Skorski | |
| 2004/0039646 A1 | 2/2004 | Hacker | |
| 2004/0041818 A1 | 3/2004 | White et al. | |
| 2004/0073546 A1 | 4/2004 | Forster et al. | |
| 2004/0073564 A1 | 4/2004 | Haber et al. | |
| 2004/0088228 A1 | 5/2004 | Mercer et al. | |
| 2004/0093243 A1 | 5/2004 | Bodin et al. | |
| 2004/0117046 A1 | 6/2004 | Colle et al. | |
| 2004/0122735 A1 | 6/2004 | Meshkin et al. | |
| 2004/0128320 A1 | 7/2004 | Grove et al. | |
| 2004/0139203 A1 | 7/2004 | Graham, Jr. et al. | |
| 2004/0148342 A1 | 7/2004 | Cotte | |
| 2004/0156020 A1 | 8/2004 | Edwards | |
| 2004/0163047 A1 | 8/2004 | Nagahara et al. | |

(56) References Cited

U.S. PATENT DOCUMENTS

| | | | |
|---|---|---|---|
| 2004/0181464 A1 | 9/2004 | Vanker et al. | |
| 2004/0199413 A1 | 10/2004 | Hauser et al. | |
| 2004/0220863 A1 | 11/2004 | Porter et al. | |
| 2004/0225664 A1 | 11/2004 | Casement | |
| 2004/0230897 A1 | 11/2004 | Latzel | |
| 2004/0255233 A1 | 12/2004 | Croney et al. | |
| 2004/0267263 A1 | 12/2004 | May | |
| 2004/0268225 A1 | 12/2004 | Walsh et al. | |
| 2004/0268232 A1 | 12/2004 | Tunning | |
| 2005/0015491 A1 | 1/2005 | Koeppel | |
| 2005/0021197 A1 | 1/2005 | Zimmerman et al. | |
| 2005/0027611 A1 | 2/2005 | Wharton | |
| 2005/0065804 A1 | 3/2005 | Worsham et al. | |
| 2005/0096963 A1* | 5/2005 | Myr | G06Q 10/06375 705/7.35 |
| 2005/0108112 A1* | 5/2005 | Ellenson | G06Q 30/0278 705/306 |
| 2005/0114270 A1 | 5/2005 | Hind et al. | |
| 2005/0114764 A1 | 5/2005 | Gudenkauf et al. | |
| 2005/0108637 A1 | 6/2005 | Sahota et al. | |
| 2005/0149398 A1 | 7/2005 | McKay | |
| 2005/0171836 A1 | 8/2005 | Leacy | |
| 2005/0176482 A1 | 8/2005 | Raisinghani et al. | |
| 2005/0187834 A1 | 8/2005 | Painter et al. | |
| 2005/0228736 A1 | 10/2005 | Norman et al. | |
| 2005/0267774 A1* | 12/2005 | Merritt | G06Q 10/0637 705/306 |
| 2005/0268282 A1 | 12/2005 | Laird | |
| 2005/0289020 A1 | 12/2005 | Bruns et al. | |
| 2005/0289599 A1 | 12/2005 | Matsuura et al. | |
| 2006/0031811 A1 | 2/2006 | Ernst et al. | |
| 2006/0059253 A1 | 3/2006 | Goodman et al. | |
| 2006/0064637 A1 | 3/2006 | Rechterman et al. | |
| 2006/0123330 A1 | 6/2006 | Horiuchi et al. | |
| 2006/0129423 A1* | 6/2006 | Sheinson | G06Q 30/02 705/306 |
| 2006/0129982 A1 | 6/2006 | Doyle | |
| 2006/0136105 A1 | 6/2006 | Larson | |
| 2006/0161841 A1 | 7/2006 | Horiuchi et al. | |
| 2006/0200751 A1 | 9/2006 | Underwood et al. | |
| 2006/0248442 A1 | 11/2006 | Rosenstein et al. | |
| 2006/0259350 A1* | 11/2006 | Ryan | G06Q 20/203 705/7.31 |
| 2006/0265355 A1 | 11/2006 | Taylor | |
| 2006/0271844 A1 | 11/2006 | Suklikar | |
| 2006/0277588 A1 | 12/2006 | Harrington et al. | |
| 2007/0005446 A1* | 1/2007 | Fusz | G06Q 30/0601 705/26.8 |
| 2007/0016486 A1 | 1/2007 | Stone et al. | |
| 2007/0027754 A1 | 2/2007 | Collins et al. | |
| 2007/0033087 A1 | 2/2007 | Combs et al. | |
| 2007/0033520 A1 | 2/2007 | Kimzey et al. | |
| 2007/0053513 A1 | 3/2007 | Hoffberg | |
| 2007/0100519 A1 | 5/2007 | Engel | |
| 2007/0150368 A1 | 6/2007 | Arora et al. | |
| 2007/0209011 A1 | 9/2007 | Padmanabhuni et al. | |
| 2007/0226540 A1 | 9/2007 | Konieczny | |
| 2007/0250229 A1 | 10/2007 | Wu | |
| 2007/0250327 A1* | 10/2007 | Hedy | G06Q 30/00 705/306 |
| 2007/0250840 A1 | 10/2007 | Coker et al. | |
| 2007/0271154 A1 | 11/2007 | Broudy et al. | |
| 2007/0271330 A1 | 11/2007 | Mattox et al. | |
| 2007/0271389 A1 | 11/2007 | Joshi et al. | |
| 2007/0282711 A1 | 12/2007 | Ullman et al. | |
| 2007/0282712 A1 | 12/2007 | Ullman et al. | |
| 2007/0282713 A1 | 12/2007 | Ullman et al. | |
| 2007/0288413 A1 | 12/2007 | Mizuno et al. | |
| 2007/0294192 A1* | 12/2007 | Tellefsen | G06Q 30/02 705/400 |
| 2008/0010561 A1 | 1/2008 | Bay et al. | |
| 2008/0015929 A1 | 1/2008 | Koeppel et al. | |
| 2008/0027827 A1* | 1/2008 | Eglen | G06Q 30/00 705/26.8 |
| 2008/0119983 A1 | 5/2008 | Inbarajan et al. | |
| 2008/0172632 A1 | 7/2008 | Stambaugh | |
| 2008/0189143 A1 | 8/2008 | Wurster | |
| 2008/0195435 A1* | 8/2008 | Bentley | G06Q 30/0204 705/7.33 |
| 2008/0195932 A1 | 8/2008 | Oikawa et al. | |
| 2008/0201163 A1* | 8/2008 | Barker | G06Q 30/06 |
| 2008/0255925 A1* | 10/2008 | Vailaya | G06Q 30/02 705/7.33 |
| 2009/0012887 A1 | 1/2009 | Taub et al. | |
| 2009/0024918 A1 | 1/2009 | Silverbrook et al. | |
| 2009/0043780 A1 | 2/2009 | Hentrich, Jr. et al. | |
| 2009/0070435 A1 | 3/2009 | Abhyanker | |
| 2009/0089134 A1 | 4/2009 | Uyeki | |
| 2009/0106036 A1 | 4/2009 | Tamura et al. | |
| 2009/0112687 A1 | 4/2009 | Blair et al. | |
| 2009/0182232 A1 | 7/2009 | Zhang et al. | |
| 2009/0187513 A1* | 7/2009 | Noy | G06Q 30/02 705/400 |
| 2009/0187939 A1 | 7/2009 | Lajoie | |
| 2009/0204454 A1 | 8/2009 | Lagudi | |
| 2009/0222532 A1 | 9/2009 | Finlaw | |
| 2009/0265607 A1 | 10/2009 | Raz et al. | |
| 2009/0313035 A1* | 12/2009 | Esser | G06Q 30/02 705/1.1 |
| 2010/0023393 A1 | 1/2010 | Costy et al. | |
| 2010/0070343 A1* | 3/2010 | Taira | G06Q 30/0206 705/400 |
| 2010/0082778 A1 | 4/2010 | Muilenburg et al. | |
| 2010/0082780 A1 | 4/2010 | Muilenburg et al. | |
| 2010/0088158 A1* | 4/2010 | Pollack | G06Q 30/02 705/7.35 |
| 2010/0100259 A1 | 4/2010 | Geiter | |
| 2010/0100506 A1* | 4/2010 | Marot | G06Q 30/0283 705/400 |
| 2010/0235219 A1 | 9/2010 | Merrick et al. | |
| 2010/0235231 A1 | 9/2010 | Jewer | |
| 2010/0293030 A1 | 11/2010 | Wu | |
| 2010/0312608 A1 | 12/2010 | Shan et al. | |
| 2010/0318408 A1* | 12/2010 | Sankaran | G06Q 10/06398 705/7.42 |
| 2010/0324777 A1 | 12/2010 | Tominaga et al. | |
| 2011/0010432 A1 | 1/2011 | Uyeki | |
| 2011/0015989 A1 | 1/2011 | Tidwell et al. | |
| 2011/0022525 A1* | 1/2011 | Swinson | G06Q 30/02 705/306 |
| 2011/0082804 A1* | 4/2011 | Swinson | G06Q 30/02 705/306 |
| 2011/0145053 A1* | 6/2011 | Hashim-Waris | G06Q 30/0235 705/14.35 |
| 2011/0145064 A1 | 6/2011 | Anderson et al. | |
| 2011/0161167 A1 | 6/2011 | Jallapuram | |
| 2011/0191264 A1* | 8/2011 | Inghelbrecht | G06Q 10/067 705/400 |
| 2011/0196762 A1* | 8/2011 | DuPont | G06Q 10/10 705/27.1 |
| 2011/0224864 A1 | 9/2011 | Gellatly et al. | |
| 2011/0231055 A1 | 9/2011 | Knight et al. | |
| 2011/0288937 A1 | 11/2011 | Manoogian, III | |
| 2011/0307411 A1* | 12/2011 | Bolivar | G06F 17/30867 705/347 |
| 2012/0066010 A1 | 3/2012 | Williams et al. | |
| 2012/0089474 A1 | 4/2012 | Xiao et al. | |
| 2012/0095804 A1 | 4/2012 | Calabrese et al. | |
| 2012/0101891 A1* | 4/2012 | Collier | G06Q 30/0234 705/14.34 |
| 2012/0116868 A1 | 5/2012 | Chin et al. | |
| 2012/0158211 A1 | 6/2012 | Chen et al. | |
| 2012/0209714 A1 | 8/2012 | Douglas et al. | |
| 2012/0221125 A1 | 8/2012 | Bell | |
| 2012/0268294 A1 | 10/2012 | Michaelis et al. | |
| 2012/0278886 A1 | 11/2012 | Luna | |
| 2012/0284113 A1* | 11/2012 | Pollak | G06Q 30/0601 705/14.43 |
| 2012/0316981 A1* | 12/2012 | Hoover | G06Q 30/0206 705/26.4 |
| 2013/0046432 A1 | 2/2013 | Edwards et al. | |

(56) References Cited

U.S. PATENT DOCUMENTS

| | | |
|---|---|---|
| 2013/0080196 A1 | 3/2013 | Schroeder et al. |
| 2013/0080305 A1 | 3/2013 | Virag et al. |
| 2013/0151334 A1 | 6/2013 | Berkhin et al. |
| 2013/0204484 A1 | 8/2013 | Ricci |
| 2013/0325541 A1 | 12/2013 | Capriotti et al. |
| 2013/0332023 A1 | 12/2013 | Bertosa et al. |
| 2014/0026037 A1 | 1/2014 | Garb et al. |
| 2014/0052327 A1 | 2/2014 | Hosein et al. |
| 2014/0088866 A1 | 3/2014 | Knapp et al. |
| 2014/0094992 A1 | 4/2014 | Lambert et al. |
| 2014/0136278 A1* | 5/2014 | Carvalho ........... G06Q 30/0629 705/7.29 |
| 2014/0229391 A1 | 8/2014 | East et al. |
| 2014/0244110 A1 | 8/2014 | Tharaldson et al. |
| 2014/0277906 A1 | 9/2014 | Lowrey et al. |
| 2014/0278805 A1 | 9/2014 | Thompson |
| 2014/0316825 A1 | 10/2014 | Van Dijk et al. |
| 2014/0324275 A1 | 10/2014 | Stanek et al. |
| 2014/0337163 A1 | 11/2014 | Whisnant |
| 2014/0379530 A1 | 12/2014 | Kim et al. |
| 2015/0057875 A1 | 2/2015 | McGinnis et al. |
| 2015/0066781 A1 | 3/2015 | Johnson et al. |
| 2015/0066933 A1 | 3/2015 | Kolodziej et al. |
| 2015/0100199 A1 | 4/2015 | Kurnik et al. |
| 2015/0142256 A1 | 5/2015 | Jones |
| 2015/0227894 A1 | 8/2015 | Mapes, Jr. et al. |
| 2015/0268059 A1 | 9/2015 | Borghesani et al. |
| 2015/0278886 A1* | 10/2015 | Fusz .................. G06Q 30/0633 705/26.8 |
| 2015/0286979 A1 | 10/2015 | Ming et al. |
| 2016/0004516 A1 | 1/2016 | Ivanov et al. |
| 2016/0071054 A1* | 3/2016 | Kakarala ............. G06Q 10/087 705/28 |
| 2016/0092944 A1 | 3/2016 | Taylor et al. |
| 2016/0132935 A1 | 5/2016 | Shen et al. |
| 2016/0140609 A1 | 5/2016 | Demir |
| 2016/0140620 A1 | 5/2016 | Pinkowish et al. |
| 2016/0140622 A1 | 5/2016 | Wang et al. |
| 2016/0148439 A1 | 5/2016 | Akselrod et al. |
| 2016/0180358 A1 | 6/2016 | Battista |
| 2016/0180378 A1 | 6/2016 | Toshida et al. |
| 2016/0180418 A1 | 6/2016 | Jaeger |
| 2016/0267503 A1 | 9/2016 | Zakai-Or et al. |
| 2016/0275533 A1 | 9/2016 | Smith et al. |
| 2016/0307174 A1 | 10/2016 | Marcelle et al. |
| 2016/0357599 A1 | 12/2016 | Glatfelter |
| 2017/0039785 A1 | 2/2017 | Richter et al. |
| 2017/0053460 A1 | 2/2017 | Hauser et al. |
| 2017/0064038 A1 | 3/2017 | Chen |
| 2017/0124525 A1 | 5/2017 | Johnson et al. |
| 2017/0262894 A1 | 9/2017 | Kirti et al. |
| 2017/0293894 A1 | 10/2017 | Taliwal et al. |
| 2017/0308844 A1 | 10/2017 | Kelley |
| 2017/0308864 A1 | 10/2017 | Kelley |
| 2017/0308865 A1 | 10/2017 | Kelley |
| 2017/0316459 A1 | 11/2017 | Strauss et al. |
| 2017/0337573 A1 | 11/2017 | Toprak |
| 2017/0352054 A1 | 12/2017 | Ma et al. |
| 2018/0225710 A1 | 8/2018 | Kar et al. |
| 2018/0232749 A1 | 8/2018 | Moore, Jr. et al. |
| 2018/0285901 A1 | 10/2018 | Zackrone |
| 2018/0285925 A1 | 10/2018 | Zackrone |
| 2019/0297162 A1 | 9/2019 | Amar et al. |
| 2019/0334884 A1 | 10/2019 | Ross et al. |
| 2020/0038363 A1 | 2/2020 | Kim |

OTHER PUBLICATIONS

"NetFormx Offers Advanced Network Discovery Software". PR Newswire. Mar. 15, 1999. Retrieved from http://www.highbeam.com/doc/1G1-54102907.html>.

Aloisio, Giovanni et al., "Web-based access to the Grid using the Grid Resource Broker portal," Google 2002, pp. 1145-1160.

Anonymous, "Software ready for prime time." Automotive News. Detroit, Nov. 5, 2001. vol. 76, Issue 5996, p. 28.

Chadwick, D. W., "Understanding X.500—The Directory." Available at <http://sec.cs.kent.ac.uk/x500book/>. 1996. Entire work cited.

Chen, Deren, "Business to Business Standard and Supply Chain System Framework in Virtual Enterprises," Computer Supported Cooperative Work in Design, The Sixth International Conference on, 2001; Publication Year: 2001, pp. 472-476.

CNY Business Journal, "Frank La Voila named Southern Tier Small-Business Person of 1999". Jun. 11, 1999. 2 pgs.

Dallas Morning News, "I know someone who knows Kevin Bacon". Oct. 27, 1998. 4 pgs.

Davis, Peter T. et al., "Sams Teach Yourself Microsoft Windows NT Server 4 in 21 Days," Sams® Publishing, © 1999. ISBN: 0-672-31555-6, 15 pgs., printed Dec. 21, 2008.

Derfler, Frank J. et al., "How Networks Work: Millennium Edition," Que, A Division of Macmillan Computer Publishing, © 2000. ISBN: 0-7897-2445-6, 9 pgs.

Final Office Action for U.S. Appl. No. 10/350,795, filed Jan. 24, 2003, and mailed from the USPTO dated Jul. 6, 2011, 26 pgs.

Final Office Action for U.S. Appl. No. 10/350,795, filed Jan. 24, 2003, and mailed from the USPTO dated Mar. 3, 2010, 24 pgs.

Final Office Action for U.S. Appl. No. 10/350,810, filed Jan. 24, 2003, and mailed from the USPTO dated Apr. 5, 2005, 12 pgs.

Final Office Action for U.S. Appl. No. 10/350,810, filed Jan. 24, 2003, and mailed from the USPTO dated May 18, 2006, 15 pgs.

Final Office Action for U.S. Appl. No. 10/350,810, filed Jan. 24, 2003, and mailed from the USPTO dated Nov. 14, 2007, 13 pgs.

Final Office Action for U.S. Appl. No. 10/351,465, filed Jan. 24, 2003, and mailed from the USPTO dated May 5, 2005, 8 pgs.

Final Office Action for U.S. Appl. No. 10/665,899, filed Sep. 18, 2003, and mailed from the USPTO dated Feb. 24, 2010, 22 pgs.

Final Office Action for U.S. Appl. No. 10/665,899, filed Sep. 18, 2003, and mailed from the USPTO dated Jul. 7, 2008, 11 pgs.

Final Office Action for U.S. Appl. No. 10/665,899, filed Sep. 18, 2003, and mailed from the USPTO dated Mar. 8, 2011, 21 pgs.

Final Office Action for U.S. Appl. No. 10/665,899, filed Sep. 18, 2003, and mailed from the USPTO dated May 11, 2009, 14 pgs.

Final Office Action for U.S. Appl. No. 11/149,909, filed Jun. 10, 2005, and mailed from the USPTO dated Feb. 4, 2009, 14 pgs.

Final Office Action for U.S. Appl. No. 11/442,821, filed May 30, 2006, and mailed from the USPTO dated Apr. 7, 2009, 19 pgs.

Final Office Action for U.S. Appl. No. 11/442,821, filed May 30, 2006, and mailed from the USPTO dated May 21, 2010, 28 pgs.

Final Office Action for U.S. Appl. No. 11/442,821, filed May 30, 2006, and mailed from the USPTO dated Nov. 29, 2011, 26 pgs.

Final Office Action for U.S. Appl. No. 11/446,011, filed Jun. 2, 2006, and mailed from the USPTO dated Jun. 8, 2010, 12 pgs.

Final Office Action for U.S. Appl. No. 11/524,602, filed Sep. 21, 2006, and mailed from the USPTO dated Jul. 27, 2010, 13 pgs.

Final Office Action for U.S. Appl. No. 11/524,602, filed Sep. 21, 2006, and mailed from the USPTO dated Jun. 26, 2012, 11 pgs.

Final Office Action for U.S. Appl. No. 11/525,009, filed Sep. 21, 2006, and mailed from the USPTO dated Aug. 3, 2010, 16 pgs.

Final Office Action for U.S. Appl. No. 12/243,852, filed Oct. 1, 2008, and mailed from the USPTO dated Oct. 24, 2011, 13 pgs.

Final Office Action for U.S. Appl. No. 12/243,861, filed Oct. 1, 2008, and mailed from theUSPTO dated Jun. 22, 2011, 5 pgs.

Final Office Action for U.S. Appl. No. 13/025,019, filed Feb. 10, 2011, and mailed from the USPTO dated Aug. 28, 2015, 25 pgs.

Final Office Action for U.S. Appl. No. 13/025,019, filed Feb. 10, 2011, and mailed from the USPTO dated Jul. 13, 2018, 11 pgs.

Final Office Action for U.S. Appl. No. 13/025,019, filed Feb. 10, 2011, and mailed from the USPTO dated Sep. 12, 2013, 13 pgs.

Final Office Action for U.S. Appl. No. 13/025,019, filed Feb. 20, 2011 and mailed from the USPTO dated Dec. 20, 2016, 16 pgs.

Final Office Action for U.S. Appl. No. 14/208,042, filed Mar. 13, 2014, and mailed from the USPTO dated Dec. 6, 2016, 26 pgs.

Final Office Action for U.S. Appl. No. 15/602,999, filed May 23, 2017, and mailed from the USPTO dated Nov. 21, 2018, Final Office Action dated Sep. 21, 2018 in U.S. Appl. No. 15/134,820.

(56) References Cited

OTHER PUBLICATIONS

Hogue et al., "Thresher: Automating the Unwrapping of Semantic Content from the World Wide Web," ACM 2005, pp. 86-95.
Housel, Barron C. et al., "WebExpress: A client/intercept based system for optimizing Web browsing in a wireless environment," Google 1998, pp. 419-431.
http://web.archive.org/web/20010718130244/http://chromedata.com/maing2/about/index.asp, 1 pg.
http://web.archive.org/web/20050305055408/http://www.dealerclick.com/, 1 pg.
http://web.archive.org/web/20050528073821/http://www.kbb.com/, 1 pg.
http://web.archive.org/web/20050531000823/http://www.carfax.com/, 1 pg.
IBM Tivoli Access Manager Base Administration Guide, Version 5.1. 2003, International Business Machines Corporation. Entire book enclosed and cited. 402 pgs.
Interconnection. (2003). In Roget's II The New Thesaurus. Boston, MA: Houghton Mifflin. Retrieved Jul. 16, 2009, from http://www.credoreference.com/entry/hmrogets/interconnection, 1 pg.
Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Michener, J.R., et al., "Managing System and Active-Content Integrity," Computer; vol. 33, Issue: 7; Publication Year: 2000, pp. 108-110.
Milic-Frayling, Natasa, et al., "SmartView: Enhanced Document Viewer for Mobile Devices," Google Nov. 15, 2002, 11 pgs.
Non-Final Office Action for U.S. Appl. No. 10/350,795, filed Jan. 24, 2003, and mailed from the USPTO dated Dec. 26, 2008, 13 pgs.
Non-Final Office Action for U.S. Appl. No. 10/350,795, filed Jan. 24, 2003, and mailed from the USPTO dated Feb. 6, 2006, 11 pgs.
Non-Final Office Action for U.S. Appl. No. 10/350,795, filed Jan. 24, 2003, and mailed from the USPTO dated Jul. 22, 2009, 22 pgs.
Non-Final Office Action for U.S. Appl. No. 10/350,795, filed Jan. 24, 2003, and mailed from the USPTO dated Jun. 29, 2006, 11 pgs.
Non-Final Office Action for U.S. Appl. No. 10/350,795, filed Jan. 24, 2003, and mailed from the USPTO dated Mar. 12, 2007, 10 pgs.
Non-Final Office Action for U.S. Appl. No. 10/350,795, filed Jan. 24, 2003, and mailed from the USPTO dated May 29, 2008, 10 pgs.
Non-Final Office Action for U.S. Appl. No. 10/350,795, filed Jan. 24, 2003, and mailed from the USPTO dated Nov. 1, 2010, 19 pgs.
Non-Final Office Action for U.S. Appl. No. 10/350,796, filed Jan. 24, 2003 and mailed from the USPTO dated May 19, 2005, 7 pgs.
Non-Final Office Action for U.S. Appl. No. 10/350,810, filed Jan. 24, 2003, and mailed from the USPTO dated Apr. 17, 2007, 12 pgs.
Non-Final Office Action for U.S. Appl. No. 10/350,810, filed Jan. 24, 2003, and mailed from the USPTO dated Dec. 9, 2005, 14 pgs.
Non-Final Office Action for U.S. Appl. No. 10/350,810, filed Jan. 24,2003, and mailed from the USPTO dated Sep. 22, 2004, 10 pgs.
Non-Final Office Action for U.S. Appl. No. 10/351,465, filed Jan. 24, 2003, and mailed from the USPTO dated Jul. 27, 2004, 9 pgs.
Non-final Office Action for U.S. Appl. No. 10/351,606, filed Jan. 24, 2003 and mailed from the USPTO dated Dec. 19, 2005, 7 pgs.
Non-final Office Action for U.S. Appl. No. 10/351,606, filed Jan. 24, 2003 and mailed from the USPTO dated May 17, 2004, 5 pgs.
Non-Final Office Action for U.S. Appl. No. 10/665,899, filed Sep. 18, 2003, and mailed from the USPTO dated Aug. 30, 2010, 23 pgs.
Non-Final Office Action for U.S. Appl. No. 10/665,899, filed Sep. 18, 2003, and mailed from the USPTO dated Nov. 13, 2008, 11 pgs.
Non-Final Office Action for U.S. Appl. No. 10/665,899, filed Sep. 18, 2003, and mailed from the USPTO dated Sep. 14, 2009, 14 pgs.
Non-Final Office Action for U.S. Appl. No. 10/665,899, filed Sep. 18, 2003, and mailed from the USPTO dated Sep. 17, 2007, 11 pgs.
Non-Final Office Action for U.S. Appl. No. 11/149,909, filed Jun. 10, 2005, and mailed from the USPTO dated May 13, 2008, 14 pgs.
Non-Final Office Action for U.S. Appl. No. 11/149,909, filed Jun. 10, 2005, and mailed from the USPTO dated May 6, 2009, 6 pgs.
Non-Final Office Action for U.S. Appl. No. 11/414,939, filed May 1, 2006, and mailed from the USPTO dated Jul. 19, 2010, 7 pgs.
Non-Final Office Action for U.S. Appl. No. 11/414,939, filed May 1, 2006, and mailed from the USPTO dated Mar. 9, 2010, 11 pgs.
Non-Final Office Action for U.S. Appl. No. 11/442,821, filed May 30, 2006, and mailed from the USPTO dated Jun. 1, 2011, 23 pgs.
Non-Final Office Action for U.S. Appl. No. 11/442,821, filed May 30, 2006, and mailed from the USPTO dated Nov. 12, 2009, 19 pgs.
Non-Final Office Action for U.S. Appl. No. 11/442,821, filed May 30, 2006, and mailed from the USPTO dated Sep. 3, 2008, 14 pgs.
Non-Final Office Action for U.S. Appl. No. 11/446,011, filed Jun. 2, 2006, and mailed from the USPTO dated Mar. 1, 2011, 15 pgs.
Non-Final Office Action for U.S. Appl. No. 11/446,011, filed Jun. 2, 2006, and mailed from the USPTO dated Nov. 27, 2009, 14 pgs.
Non-Final Office Action for U.S. Appl. No. 11/524,602, filed Sep. 21, 2006, and mailed from the USPTO dated Dec. 11, 2009, 20 pgs.
Non-Final Office Action for U.S. Appl. No. 11/524,602, filed Sep. 21, 2006, and mailed from the USPTO dated Nov. 14, 2011, 19 pgs.
Non-Final Office Action for U.S. Appl. No. 11/525,009, filed Sep. 21, 2006, and mailed from the USPTO dated Aug. 10, 2011, 18 pgs.
Non-Final Office Action for U.S. Appl. No. 11/525,009, filed Sep. 21, 2006, and mailed from the USPTO dated Dec. 16, 2009, 20 pgs.
Non-Final Office Action for U.S. Appl. No. 12/243,852, filed Oct. 1, 2008, and mailed from the USPTO dated Jan. 16, 2013, 5 pgs.
Non-Final Office Action for U.S. Appl. No. 12/243,852, filed Oct. 1, 2008, and mailed from the USPTO dated Mar. 17, 2011, 8 pgs.
Non-Final Office Action for U.S. Appl. No. 12/243,855, filed Oct. 1, 2008, and mailed from the USPTO dated Oct. 14, 2010, 6 pgs
Non-Final Office Action for U.S. Appl. No. 12/243,861, filed Oct. 1, 2008, and mailed from the USPTO dated Nov. 8, 2010, 8 pgs.
Non-Final Office Action for U.S. Appl. No. 13/025,019, filed Feb. 10, 2011, and mailed from the USPTO dated Apr. 22, 2016, 16 pgs.
Non-Final Office Action for U.S. Appl. No. 13/025,019, filed Feb. 10, 2011, and mailed from the USPTO dated Apr. 5, 2013, 15 pgs.
Non-Final Office Action for U.S. Appl. No. 13/025,019, filed Feb. 10, 2011, and mailed from the USPTO dated Oct. 6, 2017, 17 pgs.
Non-Final Office Action for U.S. Appl. No. 13/025,019, filed Feb. 10, 2011, and mailed from the USPTO dated Sep. 18, 2014, 15 pgs.
Non-Final Office Action for U.S. Appl. No. 15/134,820, filed Apr. 21, 2016, and mailed from the USPTO dated Feb. 23, 2018.
Non-Final Office Action for U.S. Appl. No. 15/602,999, filed May 23, 2017, and mailed from the USPTO dated May 3, 2018.
Notice of Allowance and Fee(s) Due for U.S. Appl. No. 10/350,795, filed Jan. 24, 2003, and mailed from the USPTO dated May 7, 2012, 15 pgs.
Notice of Allowance and Fee(s) Due for U.S. Appl. No. 10/350,796, filed Jan. 24, 2003 and mailed from the USPTO dated Feb. 1, 2006, 5 pgs.
Notice of Allowance and Fee(s) Due for U.S. Appl. No. 10/350,810, filed Jan. 24, 2003, and mailed from the USPTO dated Apr. 14, 2008, 6 pgs.
Notice of Allowance and Fee(s) Due for U.S. Appl. No. 10/351,465, filed Jan. 24, 2003, and mailed from the USPTO dated Sep. 21, 2005, 4 pgs.
Notice of Allowance and Fee(s) Due for U.S. Appl. No. 10/351,606, filed Jan. 24, 2003, and mailed from the USPTO dated Apr. 4, 2006, 12 pgs.

(56) References Cited

OTHER PUBLICATIONS

Notice of Allowance and Fee(s) Due for U.S. Appl. No. 11/149,909, filed Jun. 10, 2005, and mailed from the USPTO dated Sep. 16, 2009, 7 pgs.
Notice of Allowance and Fee(s) Due for U.S. Appl. No. 11/414,939, filed May 1, 2006, and mailed from the USPTO dated Nov. 2, 2010, pgs.
Notice of Allowance and Fee(s) Due for U.S. Appl. No. 11/442,821, filed May 30, 2006, and mailed from the USPTO dated Jul. 30, 2012, 6 pgs.
Notice of Allowance and Fee(s) Due for U.S. Appl. No. 11/446,011, filed Jun. 2, 2006, and mailed from the USPTO dated Aug. 9, 2011, 10 pgs.
Notice of Allowance and Fee(s) Due for U.S. Appl. No. 11/524,602, filed Sep. 21, 2006, and mailed from the USPTO dated Aug. 6, 2013, 22 pgs.
Notice of Allowance and Fee(s) Due for U.S. Appl. No. 11/525,009, filed Sep. 21, 2006, and mailed from the USPTO dated Jul. 23, 2012, 19 pgs.
Notice of Allowance and Fee(s) Due for U.S. Appl. No. 12/243,852, filed Oct. 1, 2008, and mailed from the USPTO dated Feb. 27, 2013, 6 pgs.
Notice of Allowance and Fee(s) Due for U.S. Appl. No. 12/243,855, filed Oct. 1, 2008, and mailed from the USPTO dated Nov. 22, 2010, 8 pgs.
Notice of Allowance and Fee(s) Due for U.S. Appl. No. 12/243,855, filed Oct. 1, 2008, and mailed from the USPTO dated Oct. 28, 2010, 5 pgs.
Notice of Allowance and Fee(s) Due for U.S. Appl. No. 12/243,861, filed Oct. 1, 2008, and mailed from the USPTO dated Sep. 6, 2011, 10 pgs.
Notice of Non-compliant Amendment dated Dec. 12, 2006 in U.S. Appl. No. 10/350,810.
Permissions in the Java™ 2 SDK, printed Mar. 6, 2010, 45 pgs.
Restriction Requirement for U.S. Appl. No. 12/243,852, filed Oct. 1, 2008, and mailed from the USPTO dated Dec. 7, 2010.
Strebe, Matthew et al. MCSE: NT Server 4 Study Guide, Third Edition. 2000, SYBEX Inc. Front matter, pp. 284-293, and 308-347 are included. Entire book cited, 36 pgs.
Supplemental Notice of Allowability for U.S. Appl. No. 12/243,852, filed Oct. 1, 2008, and mailed from the USPTO dated Mar. 19, 2013, 3 pgs.
Trademark Electronic Search System record for U.S. Appl. No. 76375405, Word Mark "NITRA".
Lee, Adam J. et al., "Searching for Open Windows and Unlocked Doors: Port Scanning in Large-Scale Commodity Clusters," Cluster Computing and the Grid, 2005. CCGrid 2005. IEEE International Symposium on vol. 1; Publication Year: 2005 pp. 146-151 vol. 1.
Advisory Action for U.S. Appl. No. 15/602,999, filed May 23, 2017, and mailed from the USPTO dated Jan. 31, 2019, 3 pgs.
Non-Final Office Action for U.S. Appl. No. 15/134,779, filed Apr. 21, 2016, and mailed from the USPTO dated Jan. 30, 2019, 26 pgs.
Non-Final Office Action received in U.S. Appl. No. 15/134,793, filed Apr. 21, 2016, mailed by United States Patent and Trademark Office dated Jan. 30, 2019, 26 pgs.
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"Service Advisor", Automotive Dealership Institute, 2007, 26 pages.
"XTime.com Web Pages", Jan. 8, 2015, 1 page.
"XTimes Newsletter", vol. 7, 2013, 4 pages.
U.S. Appl. No. 15/134,820, Notice of Allowance, dated Jan. 28, 2019, 7 pages.
Croswell, "Service Shop Optimiztion", Modern Tire Retailer, May 21, 2013, 7 pages.
Emmanuel, "Basics to Creating an Appointment System for Automotive Service Customers", Automotiveservicemanagement.com, 2006, 9 pages.
"Openbay Announces First-of-its-Kind Connected Car Repair Service", openbay.com, Mar. 31, 2015, 14 pages.
U.S. Appl. No. 13/025,019, Notice of Allowance, dated Sep. 26, 2019, 9 pages.
U.S. Appl. No. 15/134,779, Final Office Action, dated Feb. 27, 2020, 18 pages.
U.S. Appl. No. 15/134,779, Advisory Action, dated Jul. 29, 2019, 6 pages.
U.S. Appl. No. 15/134,779, Final Office Action, dated May 17, 2019, 25 pages.
U.S. Appl. No. 15/134,779, Non-Final Office Action, dated Nov. 19, 2019, 27 pages.
U.S. Appl. No. 15/134,793, Advisory Action, dated Jul. 29, 2019, 6 pages.
U.S. Appl. No. 15/134,793, Final Office Action, dated Mar. 27, 2020, 22 pages.
U.S. Appl. No. 15/134,793, Final Office Action, dated May 13, 2019, 26 pages.
U.S. Appl. No. 15/134,793, Non-Final Office Action, dated Nov. 19, 2019, 31 pages.
U.S. Appl. No. 15/478,042, Final Office Action, dated Mar. 19, 2020, 35 pages.
U.S. Appl. No. 15/478,042, Non-Final Office Action, dated Oct. 10, 2019, 26 pages.
U.S. Appl. No. 15/478,048, Final Office Action, dated Apr. 9, 2020, 42 pages.
U.S. Appl. No. 15/478,048, Non-Final Office Action, dated Sep. 30, 2019, 30 pages.
U.S. Appl. No. 15/602,999, Notice of Allowance, dated Apr. 18, 2019, 6 pages.
U.S. Appl. No. 16/041,552, Non-Final Office Action, dated Dec. 27, 2019, 13 pages.
U.S. Appl. No. 16/041,552, Final Office Action, dated May 29, 2020, 18 pages.
Chatterjee, Pallab, et al., "On-board diagnostics not just for racing anymore", EDN.com, May 6, 2013, 7 pages.
Drawbaugh, Ben, "Automatic Link Review: an expensive way to learn better driving habits", Endgadget.com, Nov. 26, 2013, 14 pages.
Jenkins, Will, "Real-time vehicle performance monitoring with data intergrity", A Thesis Submitted to the Faculty of Mississippi State University, Oct. 2006, 57 pages.
Lavrinc, Damon, "First Android-powered infotainment system coming to 2012 Saab 9-3", Autoblog.com, Mar. 2, 2011, 8 pages.
Needham, Charlie, "Google Now Taking Appointments for Auto Repair Shops", Autoshopsolutions.com, Aug. 25, 2015, 6 pages.
openbay.com Web Pages, Openbay.com, retrieved from archive.org May 14, 2019, Apr. 2015, 6 pages.
openbay.com Web Pages, Openbay.com, retrieved from archive.org on May 14, 2019, Feb. 2014, 2 pages.
openbay.com Web Pages, Openbay.com, retrieved from archive. org, May 14, 2019, Mar. 2015, 11 pages.
Phelan, Mark, "Smart phone app aims to automate car repairs", Detroit Free Press Auto Critic, Mar. 31, 2015, 2 pages.
Pubnub Staff, "Streaming Vehicle Data in Realtime with Automatic (Pt 1)", Pubnub.com, Aug. 17, 2015, 13 pages.
Warren, Tamara, "This Device Determines What Ails Your Car and Finds a Repair Shop—Automatically", CarAndDriver.com, Apr. 8, 2015, 7 pages.
You, Song, et al., "Overview of Remote Diagnosis and Maintenance for Automotive Systems", 2005 SAE World Congress, Apr. 11-14, 2015, 10 pages.
U.S. Appl. No. 15/478,048, et al., Non-Final Office Action, dated Mar. 8, 2021, 69 pages.
U.S. Appl. No. 15/478,042, Non-Final Office Action, dated Aug. 4, 2020, 42 pages.
U.S. Appl. No. 15/134,793, Notice of Allowance, dated Nov. 2, 2020, 13 pages.
U.S. Appl. No. 15/134,779, Notice of Allowance, dated Sep. 9, 2020, 12 pages.
U.S. Appl. No. 16/041,552, Non-Final Office Action, dated Sep. 17, 2020, 16 pages.

(56) References Cited

OTHER PUBLICATIONS

U.S. Appl. No. 15/478,042, et al., Final Office Action, dated May 5, 2021, 38 pages.
U.S. Appl. No. 16/041,552, et al., Final Office Action, dated Apr. 27, 2021, 23 pages.
U.S. Appl. No. 16/951,833, et al., Non-Final Office Action, dated Feb. 4, 2021, 10 pages.
Clemens Grelck, et al.,"A Multithread Compiler Backend for High-Level Array Programming", 2003.
Open Bank Project, et al., https://www.openbankproject.com/, retrieved Nov. 23, 2020, 10 pages.
Standards for Technology in Auto, et al., https://www.starstandard.org/, retrieved Nov. 23, 2020, 4 pages.

* cited by examiner

402

Formula Desc:
At Age:
Change Price Base on Median:
Amount/Percentage: Percentage
Profit Protection:

Add

404

Go to Formula Groups
Formula Group: CORE

| Formula Desc | Change Type | Change Amount | At Age | Profit Protection | Created By | Created Date | Disable |
|---|---|---|---|---|---|---|---|
| BUCKET 1 | Percentage | 102.00% | 1 | $2,500.00 | John Collins | 11/19/2012 | ✓ |
| BUCKET 2 | Percentage | 97.00% | 21 | $1,500.00 | John Collins | 11/19/2012 | ✓ |
| BUCKET 3 | Percentage | 95.00% | 35 | $600.00 | John Collins | 11/19/2012 | ✓ |
| BUCKET 4 | Percentage | 93.00% | 46 | ($500.00) | John Collins | 11/19/2012 | ✓ |

Go to Formula Groups

PRICING SYSTEM FOR IDENTIFYING PRICES FOR VEHICLES OFFERED BY VEHICLE DEALERSHIPS AND OTHER ENTITIES

CROSS-REFERENCE TO RELATED APPLICATION AND PRIORITY CLAIM

This application claims priority under 35 U.S.C. § 119(e) to U.S. Provisional Patent Application No. 61/798,025 filed on Mar. 15, 2013. This provisional patent application is hereby incorporated by reference in its entirety.

TECHNICAL FIELD

This disclosure relates generally to pricing systems. More specifically, this disclosure relates to a pricing system for identifying prices for vehicles offered by vehicle dealerships and other entities.

BACKGROUND

Vehicle dealerships often include a large number of vehicles for sale or lease on their premises. Many times, the prices for vehicles at one dealership are determined and updated manually by comparing the dealership's prices to other dealerships' prices. This is often a lengthy and time-consuming process.

SUMMARY

This disclosure provides a pricing system for identifying prices for vehicles offered by vehicle dealerships and other entities.

In a first embodiment, a method includes identifying, for a specified vehicle, a competitive set of other vehicles based on input from a user. The method also includes receiving from the user one or more parameters to be used in pricing the specified vehicle. The method further includes identifying a recommended price for the specified vehicle using the competitive set and the one or more parameters.

In a second embodiment, a system includes at least one memory configured to store information identifying, for a specified vehicle, a competitive set of other vehicles. The system also includes at least one processing device configured to receive from a user one or more parameters to be used in pricing the specified vehicle and identify a recommended price for the specified vehicle using the competitive set and the one or more parameters.

In a third embodiment, a non-transitory computer readable medium embodies a computer program. The computer program includes computer readable program code for identifying, for a specified vehicle, a competitive set of other vehicles based on input from a user. The computer program also includes computer readable program code for receiving from the user one or more parameters to be used in pricing the specified vehicle. The computer program further includes computer readable program code for identifying a recommended price for the specified vehicle using the competitive set and the one or more parameters.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4 through 9 illustrate example graphical user interfaces that could be supported in the system of FIG. 1 in accordance with this disclosure.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
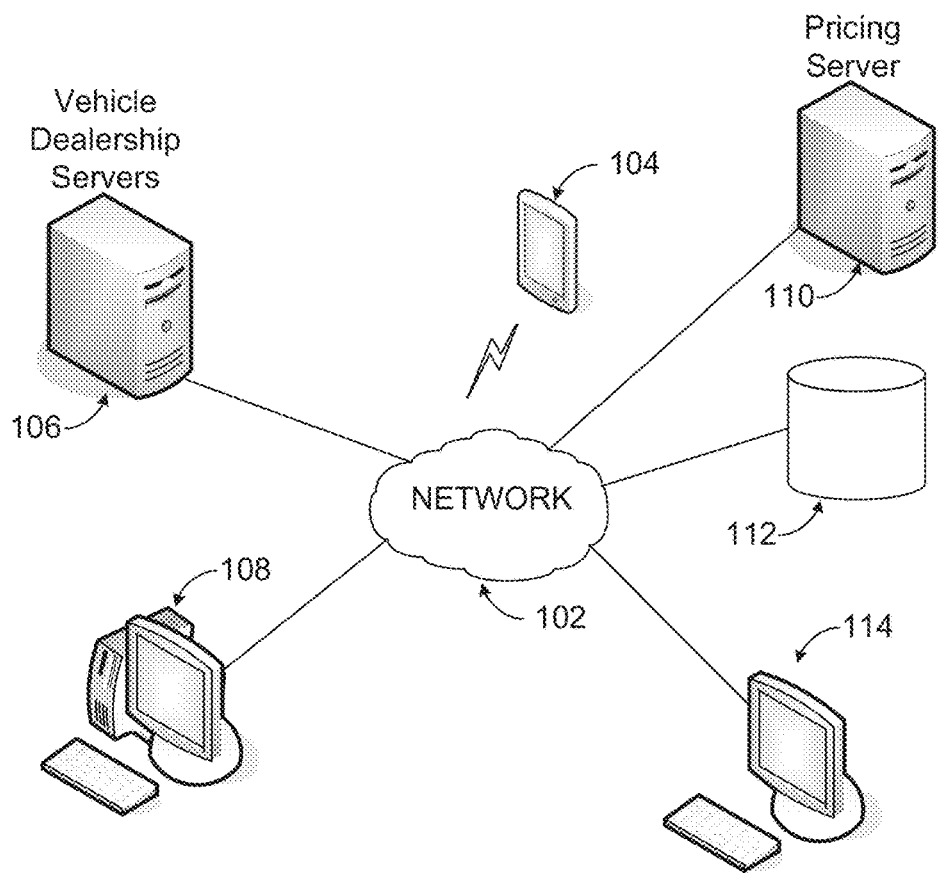
FIG. 1 illustrates an example pricing system for identifying prices for vehicles offered by vehicle dealerships and other entities in accordance with this disclosure.

FIG. 1 illustrates an example pricing system 100 for identifying prices for vehicles offered by vehicle dealerships and other entities in accordance with this disclosure. As shown in FIG. 1, the system 100 includes a network 102. The network 102 generally represents a communication network or combination of communication networks facilitating communication between different devices or systems. Each network 102 provides any suitable communication links, such as wired, wireless, or fiber optic links. In particular embodiments, the network 102 includes a combination of networks, such as the Internet, one or more cellular communication networks, and one or more wide or local area networks (which could support wired or wireless communications).

One or more consumer or end user devices 104 communicate via the network 102. The user devices 104 generally denote devices used by dealership personnel or other people to send/receive data and interact with other devices or systems. The user devices 104 include mobile devices that can communicate wirelessly with at least one of the networks 102. In this example, the user device 104 represents a smartphone, although other types of user devices (such as a personal digital assistant or tablet) could be used. Any other or additional user devices could be used in the system 100, and the system 100 can support interaction with any number of user devices.

One or more vehicle dealership servers 106 also communicate over the network 102. Each server 106 represents a computing device that can be used to provide or receive information associated with one or more vehicles offered by an associated dealership. For example, a dealership's server 106 could store and process data identifying new or used vehicles offered by the dealership, prices for those vehicles, and other information associated with those vehicles (such as make/model, mileage, trim, options, and condition of each vehicle). Any other or additional information can be provided by, maintained, or received by each server 106. Each server 106 includes any suitable structure supporting the usage of information about vehicles, such as a server computer.

One or more operator stations 108 are capable of interacting with an associated server 106. For example, an operator station 108 may allow dealership personnel to enter information about new or existing vehicles or perform other actions associated with the information maintained by the server 106. Each operator station 108 includes any suitable structure supporting interaction with a vehicle dealership server, such as a desktop computer, laptop computer, dumb terminal, or mobile device.

As shown in FIG. 1, the system 100 further includes a pricing server 110 and a database 112. The pricing server 110 analyzes information associated with a vehicle market and makes pricing recommendations to one or more dealerships or other entities. The pricing server 110 could use any suitable data and analysis techniques to identify possible prices for vehicles offered for sale or lease. The pricing server 110 includes any suitable structure supporting vehicle pricing. The database 112 includes any suitable information storage and retrieval device(s). One or more operator stations 114 are capable of interacting with the pricing server 110.

Although FIG. 1 illustrates one example of a pricing system 100 for identifying prices for vehicles offered by vehicle dealerships and other entities, various changes may be made to FIG. 1. For example, FIG. 1 is intended as an example system that could support vehicle pricing and is not intended as an architectural limitation. Also, various components in FIG. 1 could be combined, further subdivided, rearranged, or omitted and additional components could be added according to particular needs. As a particular example, the functionality of the pricing server 110 could be incorporated into one or more servers 106.

Figure 2:
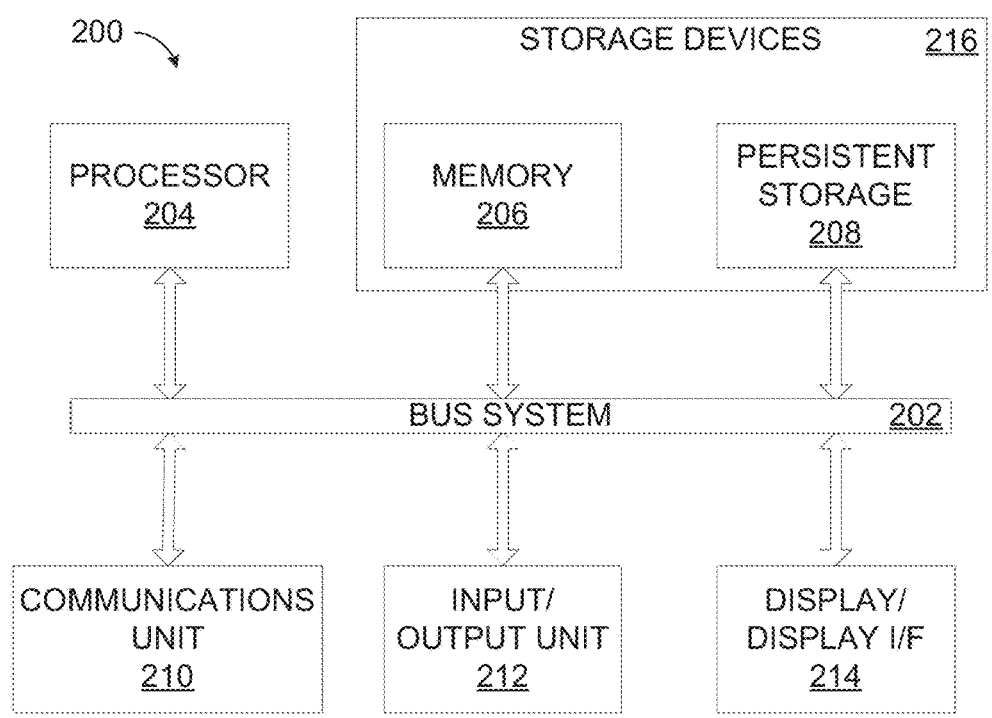
FIG. 2 illustrates an example device that can be used in the system of FIG. 1 in accordance with this disclosure.

FIG. 2 illustrates an example device 200 that can be used in the system 100 of FIG. 1 in accordance with this disclosure. The device 200 could represent any of the components 104, 106, 108, 110, 114 in FIG. 1.

In this example, the device 200 includes a bus system 202. The bus system 202 supports communication between a processing unit 204, a memory 206, a persistent storage 208, a communications unit 210, an input/output (I/O) unit 212, and a display or display interface 214. Any suitable bus or buses could be used here.

The processing unit 204 processes software instructions loaded into the memory 206. The processing unit 204 may include a single processor, multiple processors, one or more multi-processor cores, or other type of processor depending on the particular implementation. As an example, the processing unit 204 may be implemented using a number of heterogeneous processor systems in which a main processor is present with secondary processors on a single chip. As another example, the processing unit 204 may be a symmetric multi-processor system containing multiple processors of the same type. Any suitable processing device(s) could be used.

The memory 206 and the persistent storage 208 are examples of storage devices 216. A storage device is any piece of hardware capable of storing information, such as data, program code, and/or other suitable information on a temporary or permanent basis. The memory 206 may be a random access memory or other volatile or non-volatile storage device(s). The persistent storage 208 may contain one or more components or devices, such as a hard drive, flash memory, optical disc, or other persistent storage device(s). A storage device may be fixed or removable, such as when a removable hard drive or USB thumb drive is used.

The communications unit 210 provides for communications with other systems or devices. For example, the communications unit 210 could include a network interface card or a wireless transceiver. The communications unit 210 may provide communications through physical or wireless communications links.

The I/O unit 212 allows for input and output of data using other components connected to or integrated within the device 200. For example, the I/O unit 212 may provide a connection for user input through a keyboard, mouse, or other input device. The I/O unit 212 may also send output to a display, printer, or other output device. The I/O unit 212 could alternatively include a keyboard, mouse, or other input or output device(s). If the device 200 includes a display 214, the display 214 provides a mechanism to visually present information to a user. In the user devices 104, the display 214 could represent a touchscreen.

Program code for an operating system, applications, or other programs may be located in the storage devices 216, which are in communication with the processing unit 204 through the bus system 202. Instructions forming the programs may be loaded into the memory 206 for processing by the processing unit 204.

Although FIG. 2 illustrates one example of a device 200 that can be used in the system 100 of FIG. 1, various changes may be made to FIG. 2. For example, FIG. 2 is simply meant to illustrate possible components in one specific implementation of a device. Each of the components 104, 106, 108, 110, 114 in FIG. 1 could be implemented in other ways, such as other ways that incorporate one or more processing units, one or more memory units storing data and instructions used/generated/collected by the processing unit(s), and one or more interfaces for communicating over the network 102.

As noted above, the pricing server 110 can be used by dealerships or other entities to help identify one or more prices for one or more vehicles. To accomplish this, the pricing server 110 supports an automated dynamic pricing tool. The tool can automatically syndicate a user's price settings for his or her own vehicle to retail listings for other vehicles at a frequency set by the user. The price for the user's vehicle at any given moment in time can be determined by formulas and conditions set by the user during the initialization of the tool or as time progresses. The same overall process can be used to automatically set prices for multiple vehicles owned or managed by the user.

Figure 3:
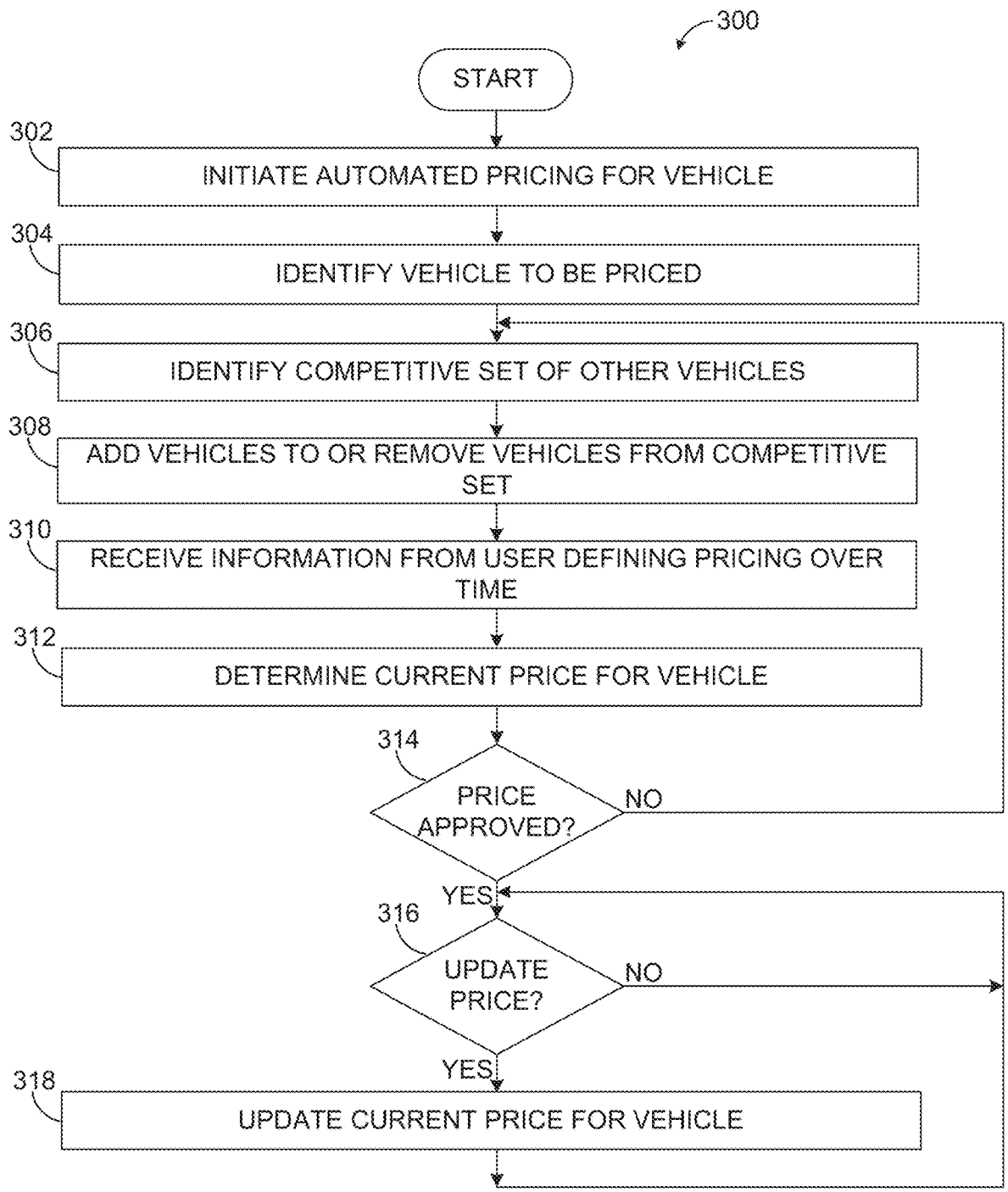
FIG. 3 illustrates an example method for identifying prices for vehicles offered by vehicle dealerships and other entities in accordance with this disclosure.

FIG. 3 illustrates an example method 300 for identifying prices for vehicles offered by vehicle dealerships and other entities in accordance with this disclosure. The method 300 could be used by the pricing server 110 using information from the database 112 and optionally from one or more dealership servers 106. However, the method 300 could be used by any suitable device and using data from any suitable source(s).

As shown in FIG. 3, automated pricing for a vehicle is initiated at step 302, and the vehicle to be priced is identified at step 304. This could include, for example, a user using an end user device 104 or operator console 108 logging into the pricing server 110 and providing information about a specific vehicle. The vehicle information could include information such as the make/model, mileage, trim, options, and condition of the vehicle.

A competitive set of other vehicles is identified at step 306, and vehicles can be added to or removed from the competitive set at step 308. The "competitive set" represents the set of vehicles within the marketplace that the user wishes to price his or her vehicle against. The vehicles in the competitive set are typically vehicles that are most similar to the user's vehicle, such as in terms of make, model, options, trim level, and mileage (although other or additional factors could be used). Also, the vehicles in the competitive set are typically vehicles within a given distance of the user's intended market, where the distance could be set by the user. A competitive set could be generated manually or automatically.

A manual competitive set can be defined by the user. For example, the user could manually select the particular vehicles from the marketplace to be included in the competitive set. In some embodiments, the pricing server 110 can use market filters to identify matching vehicles for the user. Example market filters could include filters identifying whether new vehicles entering the marketplace have certain features (such as leather seats, specified colors, navigation packages, or trim levels) or are within a specified distance of the user's vehicle. Other filters can include dealership, drivetrain, transmission, mileage, pricing, CPO (Certified Pre-Owned) unit, and other options. The user can view the filtered results (or all results without filtering) and manually add vehicles to or remove vehicles from the competitive set. If a new vehicle enters the market after creation of the competitive set, the user may be required to add manually the new vehicle to the competitive set. New vehicles entering the market can be automatically tagged as new by the pricing server 110 based on the last day a vehicle was added to the competitive set. As vehicles sell in the market, the vehicles could be dropped automatically from the competitive set.

A competitive set can also be generated automatically, such as by the pricing server 110. The pricing server 110 can use the market filters defined by the user to locate suitable vehicles for the set. The pricing server 110 can save the user's market filters and monitor the market on a daily (or other) basis for vehicles that satisfy the criteria. Vehicles that match the criteria can be added automatically to the competitive set, and users need not manually add vehicles to the competitive set.

A combination of approaches can also be used. For example, a user may manually create a competitive set, and new vehicles entering the marketplace can be automatically added to the competitive set if those new vehicles satisfy the user's market filters.

Once the competitive set is defined (in any manner), vehicles can be added to or removed from the competitive set in any suitable manner. Note that this could occur at any time, and (depending on the implementation) vehicles could be added to or removed automatically from the competitive set. Also note that a vehicle can be discarded from a competitive set once a maximum age is reached, and the maximum age could be set by the user.

Information defining how to price the user's vehicle is received at step 310. For example, to price the user's vehicle against the vehicles in the competitive set, the user creates or selects a set of formulas to guide pricing over time. In some embodiments, there are four main metrics in each formula set:

Time/Age Bracket of Formula Metric (based on vehicle aging);
Pricing Guide: Median Price of Competitive Set or Initial Listing Price (ignore market price);
Percentage/Multiplier of Pricing Guide; and
Profit Protection.

The Time/Age Bracket parameter defines a formula for calculating how the user's vehicle is priced against vehicles in the competitive set based on the length of time that the user's vehicle is on the market. Multiple formula sets can be defined, where different formula sets have different Time/Age Bracket formulas. For example, the formulas can be set in a manner so that there is a continuous pricing strategy that accounts for constant vehicle aging. As a particular example, "Formula 1" can be used for vehicles on the market from zero to X days, "Formula 2" can be used for vehicles on the market from X+1 to Y days, and "Formula 3" can be used for vehicles on the market from Y+1 to Z days.

The Pricing Guide parameter defines which price(s) for the vehicles in the competitive set is/are used to price the user's vehicle. In some embodiments, the options are to use the median price of the vehicles in the competitive set or the initial listing prices of the vehicles in the competitive set. Other options could also be available, such as the average price of the vehicles in the competitive set. The use of median price can help to filter out potential outlier prices or vehicles with extenuating circumstances (which might prevent them from having an optimal market pricing). This could occur, for example, when a vehicle in the competitive set is a salvage unit or has a bloated price from an uninformed dealer. The use of initial listing price allows a user to use prices selected by other dealers, which thereby allows the user to implement a pricing strategy without the variability that a fluctuating median price metric might offer.

The Percentage/Multiplier of Pricing Guide parameter defines how much higher or lower the user wants his or her vehicle's price to be based upon the selected Pricing Guide parameter. For example, the median price could be modified up or down by a specified percentage or dollar amount, or the initial listing price could be modified up or down by a specified percentage or dollar amount.

The Profit Protection parameter allows the user to identify a price floor so that the vehicle's price does not fall below a certain level (at least without user approval). This helps to ensure that the pricing for a vehicle, or a fleet of vehicles, is not automatically adjusted below the point where adequate profit can be obtained. For example, when applied to the competitive set, a situation may arise where the user's selected pricing guide and percentage/multiplier modifier tentatively indicate that the vehicle should be at a price point below a profitable level as defined by the profit protection barrier. The barrier can then be used to keep the price at the minimum level dictated by the barrier.

These parameters can be established by a user for a vehicle in any suitable manner. For example, the user could interact with the pricing server 110 via an operator station 108 or a user device 104.

Once the parameters are set, a current price for the vehicle is determined at step 312. This could include, for example, the pricing server 110 using the competitive set and the pricing formulas to identify the current price for a vehicle based on the length of time that the vehicle has been on the market. The price is provided to the user for approval at step 314. If the price is not approved, the process can return to an earlier step (such as step 306, 308, or 310) to modify the competitive set or the pricing formulas.

For a vehicle offered online, an approved price can be displayed to online customers. For a vehicle offered at a physical location, the user or other personnel could update a price tag on the vehicle with the approved price. If the vehicle includes an electronic price tag, the electronic price tag can be updated to display the new price. Prices from the pricing server 110 could be used in any other suitable manner. For instance, the user could access a listing of the user's vehicles (including the newly-priced vehicle) to view pricing reports or other information about the vehicles.

A decision can be made whether to update the vehicle price at step 316. This could include, for example, the pricing server 110 determining whether to update the vehicle price based on changes to the competitive set, such as new vehicles entering the competitive set or other vehicles leaving the competitive set. This could also include the pricing server 110 determining that at least one price for at least one vehicle in the competitive set has changed. As described below, the change in price of a vehicle in the competitive set could be automatically used, or a user could be asked to approve a change in price before the updated price is used. This could further include the pricing server 110 determining that one pricing formula defined or selected by the user has expired and another pricing formula is to be used. If so, the vehicle price is updated at step 318.

The frequency at which a vehicle price is updated can be configured by the user. In particular embodiments, the frequency of price syndication can be set by the user in three different ways:

Daily Updates: prices are syndicated daily, such as midnight every night;
  Inventory Age: a price change is triggered on a specific day of the vehicle's age, such as the 15$^{th}$ or 30$^{th}$ day; and
  Day of Week: prices are syndicated only on certain days of the week set by the user (such as only on Wednesdays and Fridays).

Note that the parameters described above are for illustration only, and other or additional parameters could also be used to price a vehicle. For instance, once an initial price is determined using the parameters described above, the initial price could be modified based on market trend and tendency analysis or other analyses desired by the user. This allows the user to account for external market forces, such as auction activity, gas prices, and organic online demand.

Although FIG. 3 illustrates one example of a method 300 for identifying prices for vehicles offered by vehicle dealerships and other entities, various changes may be made to FIG. 3. For example, while shown as a series of steps, various steps in FIG. 3 could overlap, occur in parallel, occur in a different order, or occur any number of times.

FIGS. 4 through 9 illustrate example graphical user interfaces that could be supported in the system 100 of FIG. 1 in accordance with this disclosure. The graphical user interfaces could be used, for example, by the pricing server 110 to obtain information from a user in order to price a vehicle.

FIG. 4 illustrates an example graphical user interface 400 that allows a user to define the parameters to be used by the pricing server 110 to price a vehicle. As shown in FIG. 4, the interface 400 includes a formula definition area 402 and a formula group area 404. The formula definition area 402 allows the user to create a new formula to be used, such as by specifying a name/description of the formula, the time/age bracket for the formula, a change to the pricing guide (assumed to be median here), and a profit protection parameter. The interface 400 allows the user to define the change to the percentage/multiplier parameter as a percentage or dollar amount.

The formula group area 404 shows the user a group of predefined formulas (such as formulas predefined by the user, by another user, or by an administrator). The group of predefined formulas collectively defines how a vehicle can be priced using different formulas over time, where use of each formula begins at a different age of the vehicle (meaning a different amount of time that the vehicle has been on the market).

Figure 5:
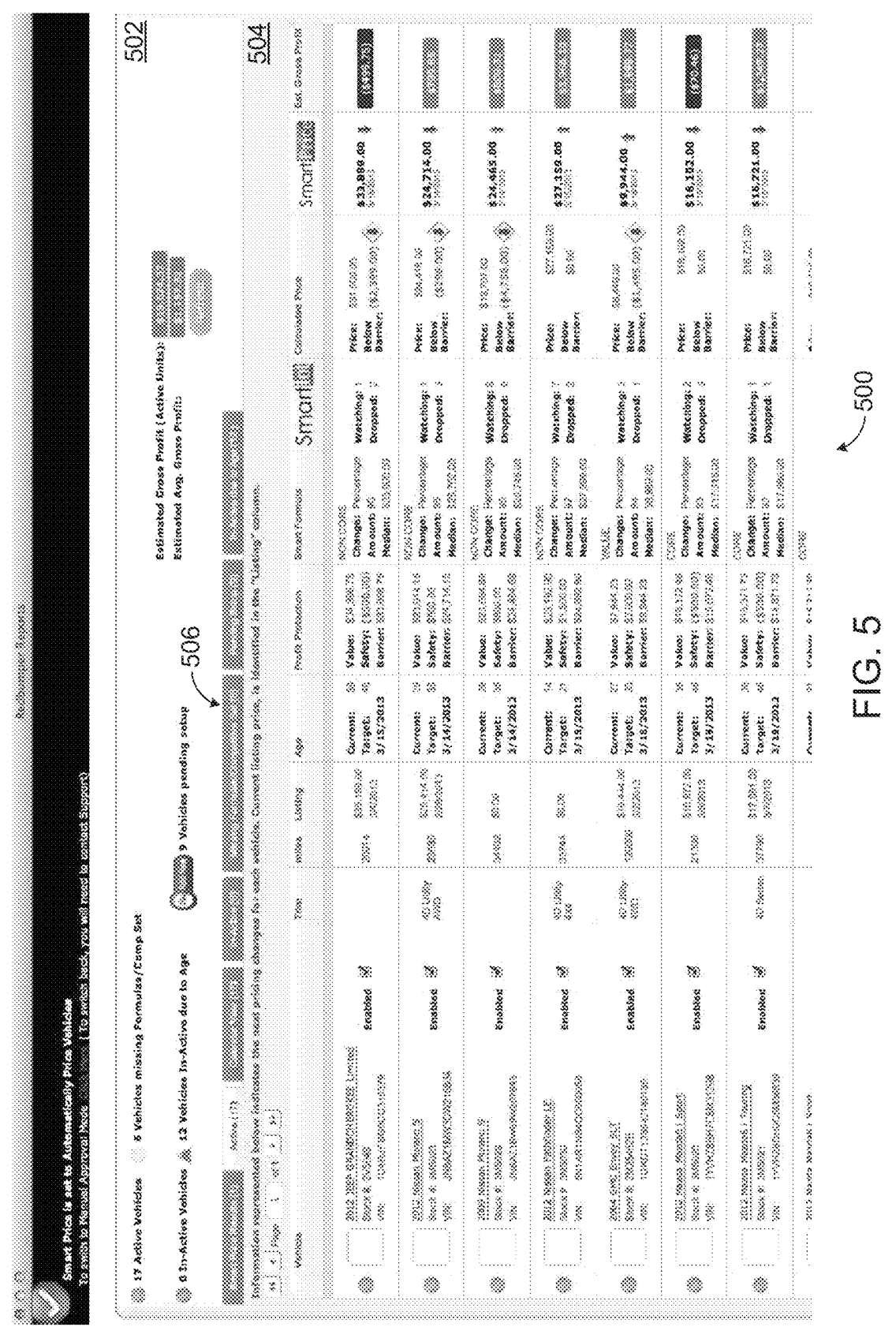

FIG. 5 illustrates an example graphical user interface 500 showing a user all of the vehicles for which the pricing server 110 is identifying prices for that user. The interface 500 includes a legend and summary area 502 identifying the meanings of different icons used in the interface 500 and a summary of the estimated gross profit and average profit per vehicle based on current vehicle pricings. The interface 500 also includes a vehicle listing area 504, which identifies each vehicle for which the pricing server 110 is identifying prices for the user. For each vehicle, various information is provided, such as the make, model, VIN, trim, mileage, and age on market. The vehicle listing area 504 also displays various pricing information, such as current list price, the new price calculated by the pricing server 110, and the parameters used by the pricing server 110.

Note that while some vehicles' prices may have a negative profit and therefore result in a loss if sold, the prices for all vehicles in the list result in a profit for the user. The estimated gross and average profits shown in the legend and summary area 502 could be based on the calculated "SmartPrice" prices, which are the prices calculated by the pricing server 110.

Tabs 506 in the interface 500 are provided for viewing other information related to the pricing server 110. For example, other tabs 506 can be used to view new prices from the pricing server 110 that are awaiting approval, prices from the pricing server 110 that are overdue for approval, prices that have been approved or rejected today or during other time periods, and a calendar to view upcoming scheduled price changes.

Figure 6:
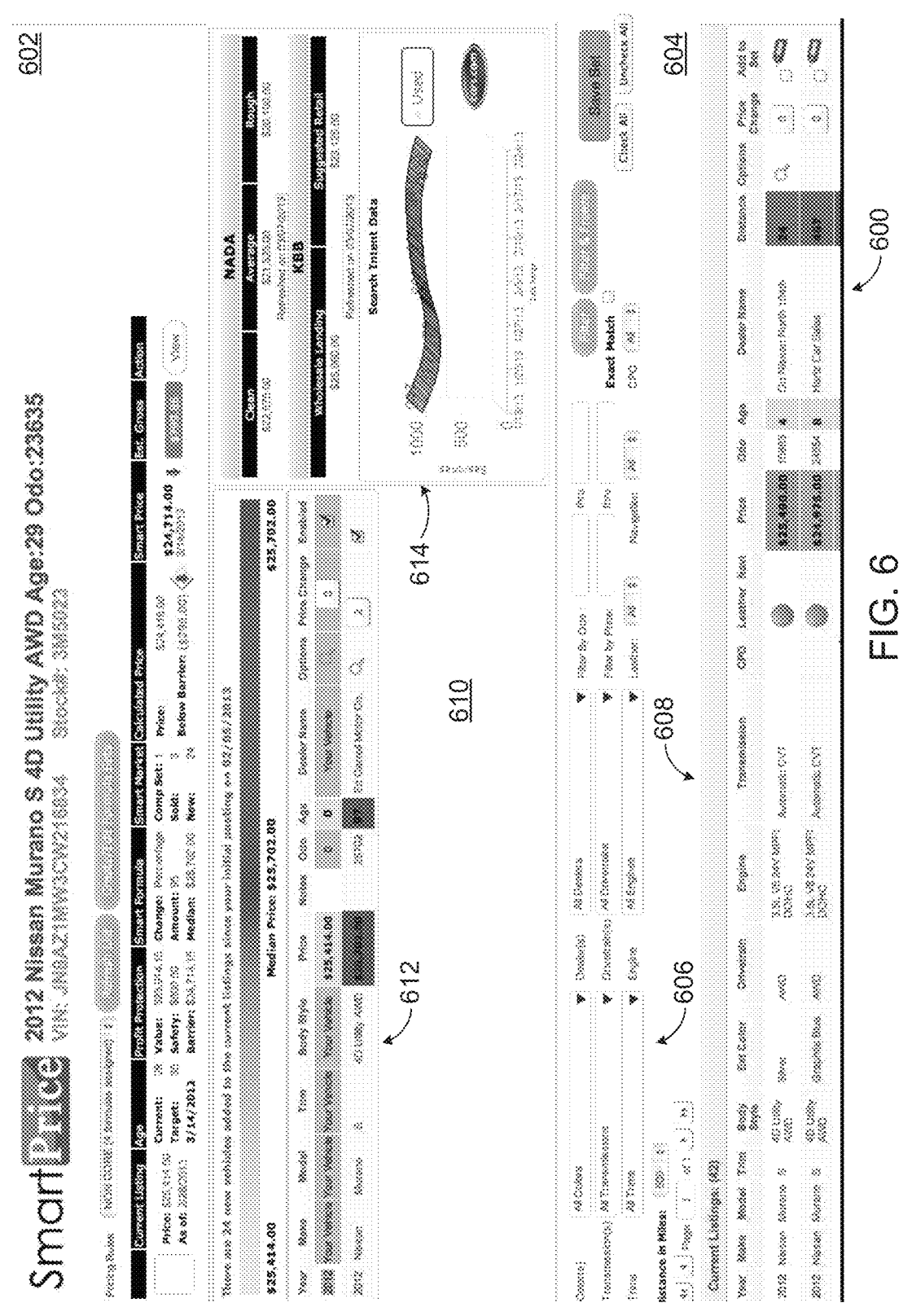

FIG. 6 illustrates an example graphical user interface 600 showing information related to the pricing of a specific vehicle. In this case, the vehicle is the second vehicle from the list of FIG. 5. A top portion 602 of this interface 600 shows the specific vehicle information. A bottom portion 604 of this interface 600 includes filters 606 and a list 608 of vehicles currently satisfying the filters 606. The vehicles in the list 608 can be used to define the competitive set for the vehicle identified at the top of the interface 600. For example, the user can select which vehicles in the list 608 are to be included in the competitive set, and the user can optionally enter one or more price changes to be applied to one or more vehicles in the competitive set.

A middle portion 610 of this interface 600 includes a section 612 identifying the vehicles in the competitive set and the median price of the vehicles in the competitive set. The middle portion 610 of this interface 600 also includes a section 614 containing information from other sources (namely NADA and KELLEY BLUE BOOK in this example).

Figure 7:
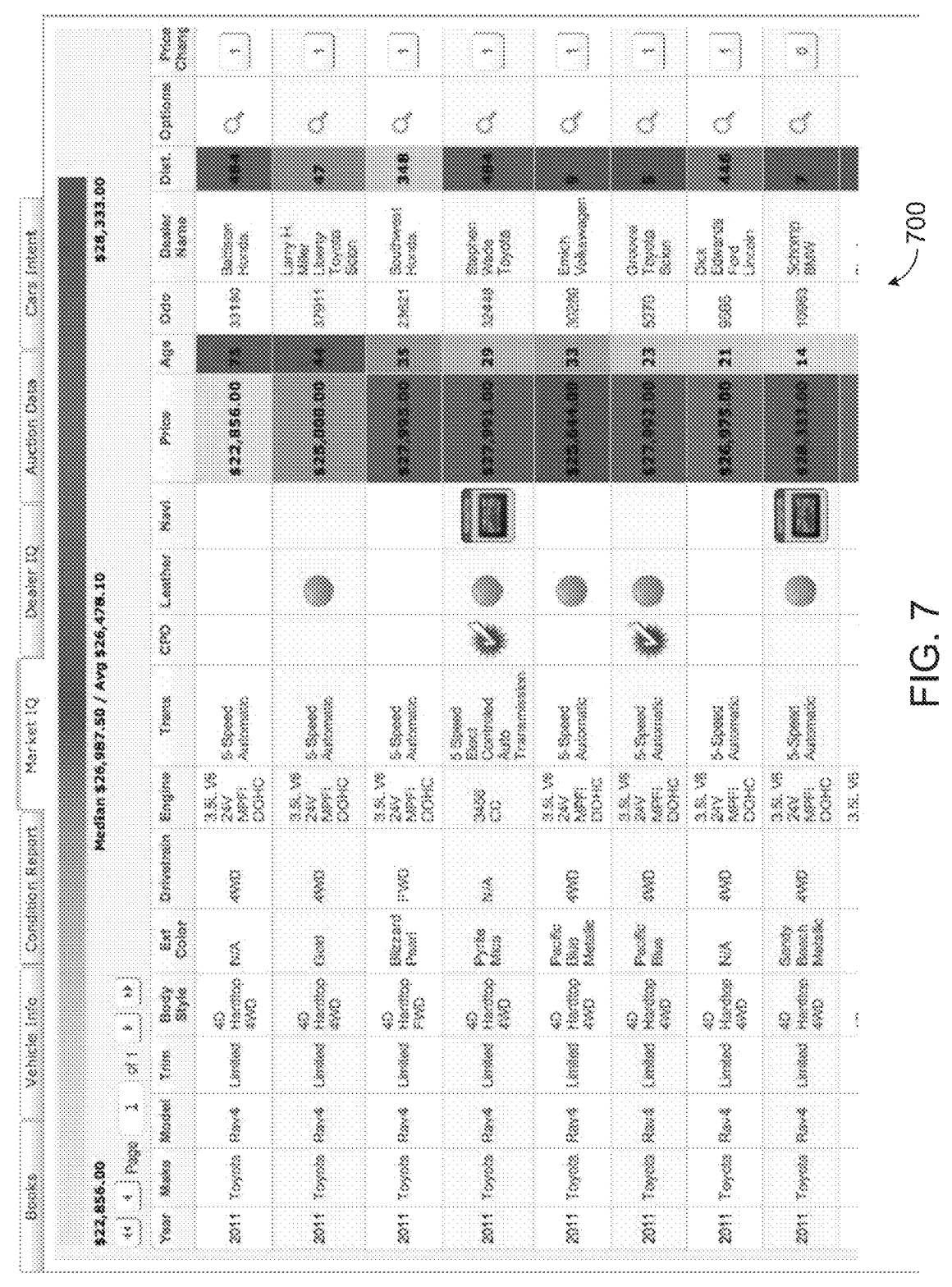

FIG. 7 illustrates an example graphical user interface 700 showing a "Market IQ" for a type of vehicle. This type of interface 700 can be useful in allowing a user to compare a proposed price for a vehicle from the pricing server 110 to other vehicles on the market. This type of interface 700 could be useful in helping the user review other vehicles on the market and determine whether to accept or reject a proposed price from the pricing server 110.

Figure 8:
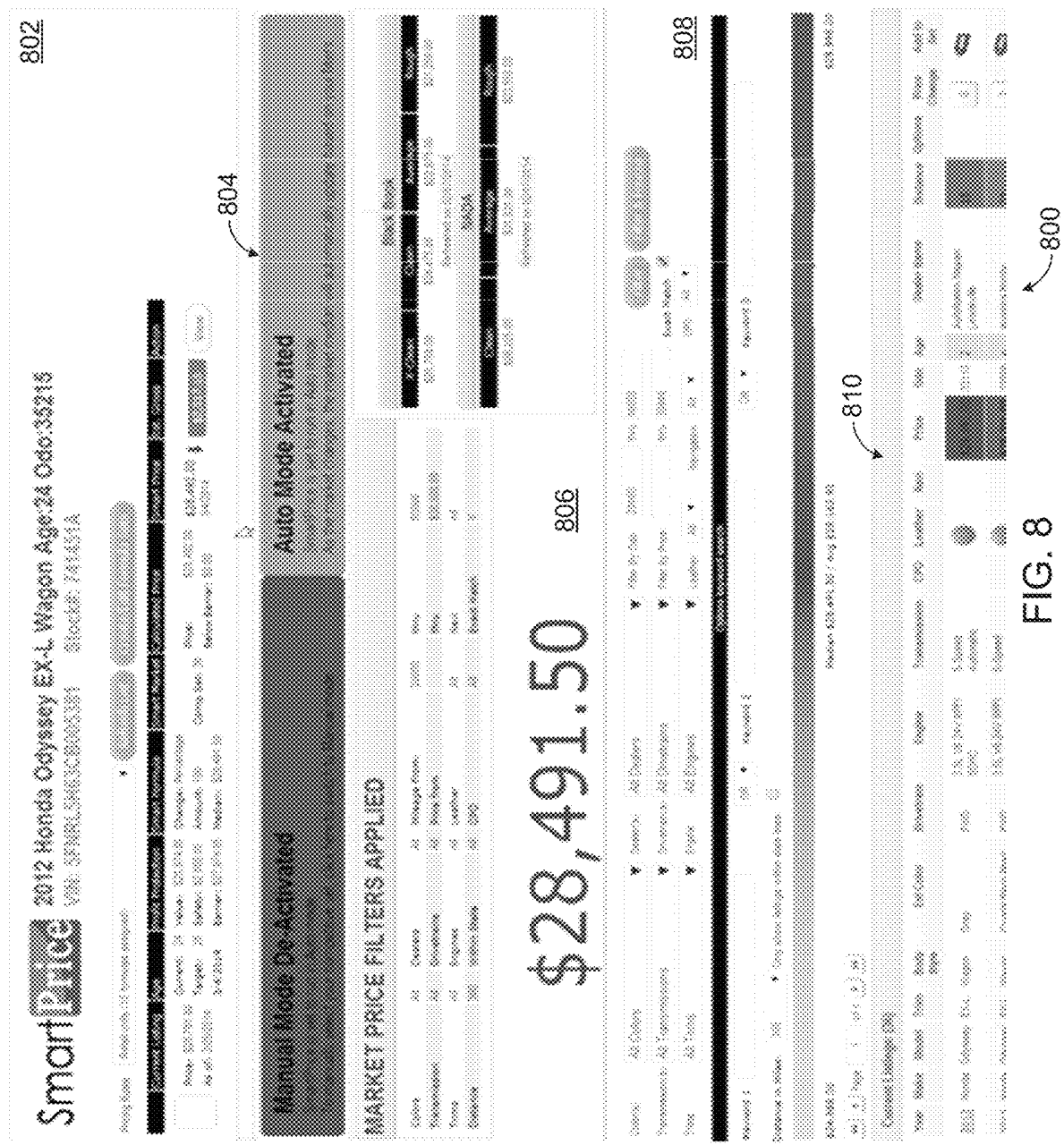

FIG. 8 illustrates an example graphical user interface 800 that allows a user to control the creation or modification of a competitive set. The graphical user interface 800 can include much of the same information shown in FIG. 6 (although in a different format). However, as described above, a competitive set can be defined manually by a user or automatically based on input from the user. The graphical user interface 800 here allows the user to control the mode of defining the competitive set.

As shown in FIG. 8, a top portion 802 of this interface 800 shows the specific vehicle information. Controls 804 allow a user to control whether the pricing server 110 identifies a competitive set in a manual mode or in an automatic mode. In the manual mode, the competitive set can be defined solely based on input from the user, where the user adds vehicles to or removes vehicles from the competitive set. In the automatic mode, the competitive set can be defined by the pricing server 110 based on market filters, where the pricing server 110 adds vehicles to or removes vehicles from the competitive set.

A middle portion 806 of this interface 800 includes a summary of the current market filters being used to automatically generate a competitive set and the price identified by the pricing server 110 using that competitive set. The middle portion 806 of this interface 800 also includes information from other sources (namely NADA and BLACK BOOK in this example).

A bottom portion 808 of this interface 800 includes various filters and keyword searching tools used to define the competitive set for the vehicle identified at the top of the interface 800. Also, a list 810 identifies the vehicles that currently satisfy the filters and keywords and that form the competitive set. In the automatic mode, as new vehicles are added to or dropped from the marketplace, the competitive set is dynamically updated, such as on a daily or other basis.

Figure 9:
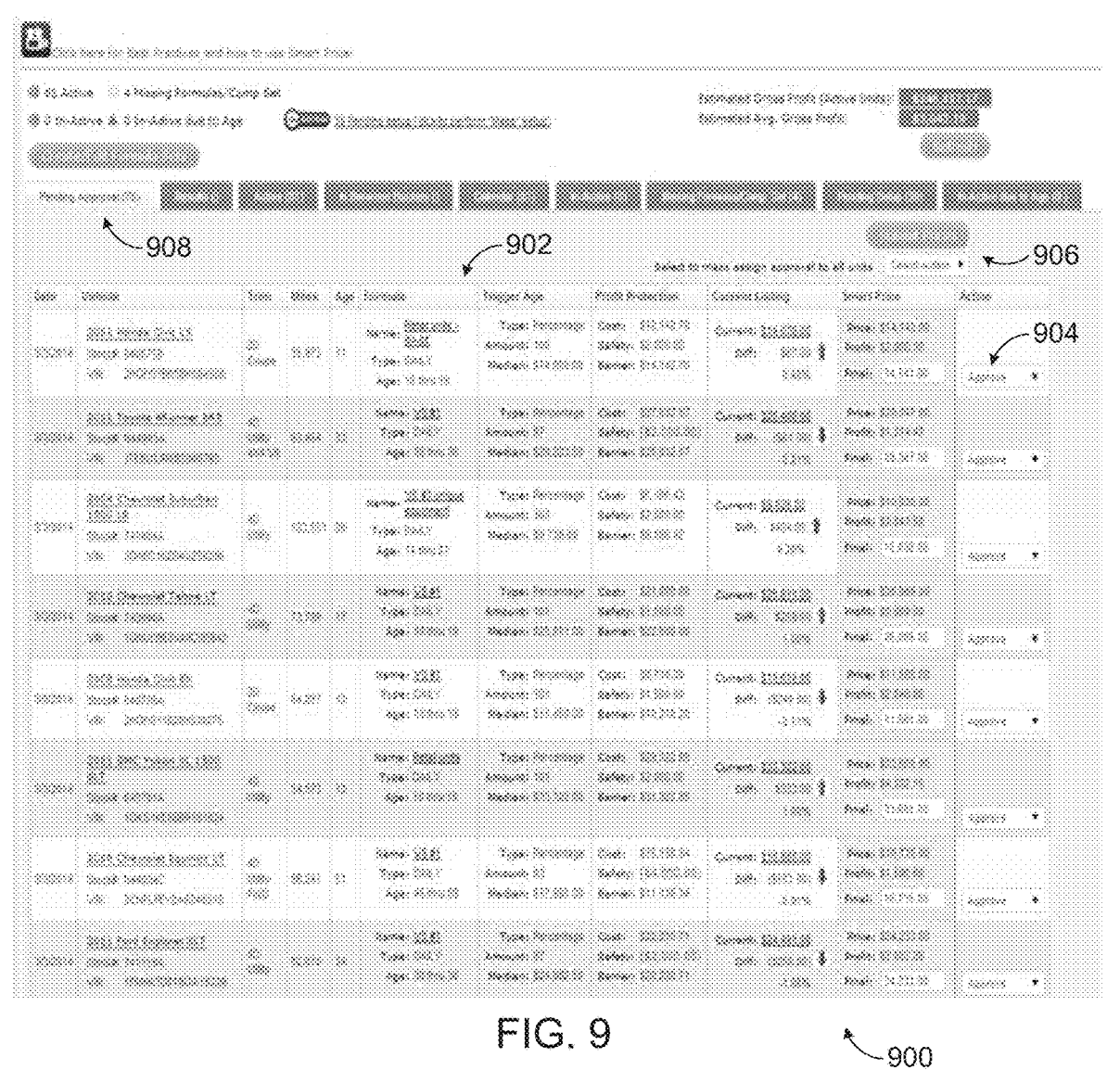

FIG. 9 illustrates an example graphical user interface 900 that allows a user to control whether price changes for vehicles in a competitive set are acceptable. As noted above, a change in the price of a vehicle in a competitive set can be used to update the price of a specified vehicle as determined by the pricing server 110. In an automatic mode, a change in the price of one or more vehicles in a competitive set can be used to automatically update a specified vehicle's price. In a manual mode, a change in the price of one or more vehicles in a competitive set can be used to update a specified vehicle's price if a price change is approved by a user. The graphical user interface 900 here allows the user to approve changes in vehicle prices.

As shown in FIG. 9, the interface 900 includes a list 902 of vehicles having price changes, where the vehicles in the list 902 are used in one or more competitive sets. For each vehicle in the list 902, there is a control 904 (in this case a drop-down menu) that allows the user to approve or reject the price change. An approved price change can be used to update the price of one or more vehicles, while a rejected price change is not. Controls 906 allow the user to approve or reject all price changes in the list 902. A tab 908 here is added to allow the user to access the list of pending approvals for vehicle price changes.

Color codings can be used in various ones of these interfaces to differentiate different prices, lengths on market, profits, and distances from the user's market. For example, in FIG. 5, green can be used to identify positive profit values, while red can be used to identify negative profit values or losses. In FIGS. 6 and 7, yellow, green, and red can be used to respectively identify lower, medium, and higher prices or lengths on market or distances.

Although FIGS. 4 through 9 illustrate examples of graphical user interfaces 400-900 that could be supported by the pricing server 110 of FIG. 1, various changes may be made to FIGS. 4 through 9. For example, while certain input/output mechanisms are shown here (such as text boxes, checkboxes, and lists), any other suitable input/output mechanisms could be used to provide information to a user or receive information from a user. Also, the content and arrangement of information in these figures are for illustration only. The content and arrangement can be altered according to particular needs. In addition, while often shown or described as involving the purchase or sale of an automobile, any transactions involving any vehicles could be supported by the pricing server 110. Other examples could include motorcycles, boats, recreational vehicles, trucks, or any other suitable vehicles.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
 displaying, in a graphical user interface, options for a user to select a manual mode or an automatic mode to generate a competitive set of vehicles for a specified vehicle;
 the user selecting either the manual mode or the automatic mode;
 in the manual mode, generating the competitive set of vehicles for the specified vehicle by a pricing server receiving user input to add and remove vehicles to the competitive set;
 in the automatic mode, generating the competitive set of vehicles for a specified vehicle, by,
  the pricing server providing market filters defined by the user, the market filters including,
   a features filter,
   a distance filter establishing a distance of an intended market, and a pricing filter,
wherein the pricing server receives vehicle information from a plurality of vehicle dealership servers in communication with the pricing server and includes vehicles that satisfy the market filters;
the pricing server receiving from the user, via a user device, one or more parameters to be used in pricing the specified vehicle;
executing computer readable instructions stored by the pricing server, the computer-readable instructions configured to instruct a processor of the pricing server to determine a median price of the vehicles of the competitive set;
the pricing server identifying, via the pricing server, a recommended price for the specified vehicle using a set of formulas, each formula of the set of formulas taking into consideration:
 a time parameter corresponding to a length of time that the vehicle is on the market,
 a pricing guide parameter based on the determined median price of the other vehicles of the competitive set,
 a modifier parameter corresponding to how much higher or lower than the pricing guide parameter to set the recommended price, and
 a profit protection parameter to prevent the recommended price from dropping below a predetermined price floor;
in the automatic mode,
 the pricing server monitoring additional vehicle information received from the plurality of vehicle dealership servers,
 the pricing server automatically adding vehicles to the competitive set that satisfy the market filters, and
 the pricing server automatically removing sold vehicles from the competitive set as vehicles are sold;
in the manual mode, updating the competitive set by the user manually adding vehicles to and removing vehicles from the competitive set;
the pricing server receiving price changes for one or more vehicles in the competitive set;
displaying, via a graphical user interface, a list of the one or more vehicles in the competitive set with received price changes, wherein the list includes proposed price changes for each vehicle in the list;
displaying, via a graphical user interface, a first control option for each vehicle in the list to allow the user to approve or reject each price change;
the pricing server approving or rejecting a price change in response to user operation of the first control option;
displaying, via a graphical user interface, a second control option for the user to approve or reject price changes for all vehicles in the list;
the pricing server approving or rejecting price changes in response to user operation of the second control option;
the pricing server updating the recommended price for the specified vehicle at predefined intervals based on changes to the competitive set and the one or more parameters; and
updating, via a network, a graphical user interface with the recommended price for the specified vehicle.

2. The method of claim 1, wherein each formula of the set of formulas is associated with a different length of time that the specified vehicle is available, and wherein the recommended price is identified using a formula of the set of formulas that is associated with a length of time that the specified vehicle has been available.

3. The method of claim 1, wherein identifying the recommended price comprises:
 using a first one of the set of formulas to identify a first recommended price for the specified vehicle; and
 after a specified amount of time has elapsed, using a second one of the set of formulas to identify a lower second recommended price for the specified vehicle.

4. The method of claim 1, wherein each formula of the set of formulas defines a continuous pricing strategy that accounts for constant vehicle aging.

5. The method of claim 1, wherein receiving the one or more parameters comprises receiving a selection or definition of at least one formula of the set of formulas to be used to identify the recommended price.

6. The method of claim 1, wherein the modifier parameter comprises one of: a specified amount or a specified percentage.

7. A system comprising:
a user device configured to display a graphical user interface including options for a user to select a manual mode or an automatic mode to generate a competitive set of vehicles for a specified vehicle;
a pricing server in electrical communication with the user device to receive, from the user device, selection of the manual mode or the automatic mode;
in the manual mode, the pricing server configured to generate the competitive set of vehicles based on user input to add and remove vehicles to the competitive set;
in the automatic mode, the pricing server configured to generate the competitive set of vehicles by user of market filters including,
 a features filter,
 a distance filter establishing a distance of an intended market, and
 a pricing filter,
wherein the pricing server receives vehicle information from a plurality of vehicle dealership servers in communication with the pricing server and includes vehicles that satisfy the market filters in the competitive set;
wherein the pricing server is further configured to:
 receive from the user device, one or more parameters to be used in pricing the specified vehicle,
 identify a recommended price for the specified vehicle using a set of formulas, each formula of the set of formulas taking into consideration the one or more parameters comprising:
  a time parameter corresponding to a length of time that the specified vehicle is on the market,
  a pricing guide parameter based on a median price of the other vehicles of the competitive set,
  a modifier parameter corresponding to how much higher or lower than the pricing guide parameter to set the recommended price, and
  a profit protection parameter to prevent the recommended price from dropping below a predetermined floor,
 in the automatic mode,
  monitor additional vehicle information received from the plurality of vehicle dealership servers,
  automatically add vehicles to the competitive set that satisfy the market filters, and
  automatically remove sold vehicles from the competitive set as vehicles are sold,
 in the manual mode, update the competitive set by receiving user input to add and remove vehicles to the competitive set, and receive price changes for one or more vehicles in the competitive set;

wherein the user device is further configured to:
display, via the graphical user interface, a list of the one or more vehicles in the competitive set with received price changes, wherein the list includes proposed price changes for each vehicle in the list,
display, via the graphical user interface, a first control option for each vehicle in the list to allow the user to approve or reject each price change, and
display, via the graphical user interface, a second control option for the user to approve or reject price changes for all vehicles in the list;

wherein the pricing server is further configured to update the recommended price for the specified vehicle at predefined intervals based on the changes to the competitive set and the one or more parameters; and wherein the user device is further configured to update the graphical user interface with the recommended price for the specific vehicle.

8. The system of claim 7, wherein each formula of the plurality of formulas is associated with a different length of time that the specified vehicle is available, and wherein the recommended price is identified using a formula of the set of formulas that is associated with a length of time that the specified vehicle has been available.

9. The system of claim 7, wherein the at least one processing device is configured to:
use a first one of the set of formulas to identify a first recommended price for the specified vehicle; and
after a specified amount of time has elapsed, use a second one of the set of formulas to identify a lower second recommended price for the specified vehicle.

10. The system of claim 7, wherein each formula of the set of formulas defines a continuous pricing strategy that accounts for constant vehicle aging.

11. The system of claim 7, wherein the at least one processing device is further configured to receive a selection or definition of at least one formula of the set of pricing formulas to be used to identify the recommended price.

12. A non-transitory computer readable medium embodying a computer program, the computer program comprising computer readable program code for:
displaying, in a graphical user interface, options for a user to select a manual mode or an automatic mode to generate a competitive set of vehicles;
the user selecting either the manual mode or the automatic mode;
in the manual mode, generating the competitive set of vehicles for a specified vehicle by a pricing server receiving user input to add and remove vehicles to the competitive set;
in the automatic mode, generating the competitive set of vehicles for a specified vehicle by:
the pricing server automatically generating the competitive set of vehicles based on market filters defined by the user, the market filters including,
a features filter,
a distance filter establishing a distance of an intended market, and
a pricing filter,
wherein the pricing server receives vehicle information from a plurality of vehicle dealership servers in communication with the pricing server and includes vehicles that satisfy the market filters;
the pricing server receiving from a user, via a user device, one or more parameters to be used in pricing the specified vehicle;
the pricing server identifying, via the pricing server, a recommended price for the specified vehicle using a set of formulas, each formula of the set of formulas taking into consideration:
a time parameter corresponding to a length of time that the vehicle is on the market,
a pricing guide parameter based on a median price of the other vehicles of the competitive set,
a modifier parameter corresponding to how much higher or lower than the pricing guide parameter to set the recommended price, and
a profit protection parameter to prevent the recommended price from dropping below a predetermined price floor;
in the automatic mode,
the pricing server monitoring additional vehicle information received from the plurality of vehicle dealership servers,
the pricing server automatically adding vehicles to the competitive set that satisfy the market filters, and
the pricing server automatically removing sold vehicles from the competitive set as vehicles are sold;
in the manual mode, updating the competitive set by the user manually adding vehicles to and removing vehicles from to the competitive set;
the pricing server receiving price changes for one or more vehicles in the competitive set;
displaying, via a graphical user interface, a list of the one or more vehicles in the competitive set with received price changes, wherein the list includes proposed price changes for each vehicle in the list;
displaying, via a graphical user interface, a first control option for each vehicle in the list to allow the user to approve or reject each price change;
the pricing server approving or rejecting a price change in response to user operation of the first control option;
displaying, via a graphical user interface, a second control option for the user to approve or reject price changes for all vehicles in the list;
the pricing server approving or rejecting price changes in response to user operation of the second control option;
the pricing server updating the recommended price for the specified vehicle at predefined intervals based on changes to the competitive set and the one or more parameters; and
updating, via a network, a graphical user interface with the recommended price for the specified vehicle.

13. The computer readable medium of claim 12, wherein each formula of the set of formulas is associated with a different length of time that the specified vehicle is available, and wherein the recommended price is identified using a formula of the set of formulas that is associated with a length of time that the specified vehicle has been available.

14. The computer readable medium of claim 12, wherein the computer readable program code for identifying the recommended price comprises computer readable program code for:
using a first one of the set of formulas to identify a first recommended price for the specified vehicle; and
after a specified amount of time has elapsed, using a second one of the set of formulas to identify a lower second recommended price for the specified vehicle.

15. The computer readable medium of claim 12, wherein the computer readable program code for receiving the one or more parameters comprises computer readable program code for receiving a selection or definition of at least one formula of the set of formulas to be used to identify the recommended price.

\* \* \* \* \*